(12) United States Patent
Amin et al.

(10) Patent No.: US 11,995,513 B2
(45) Date of Patent: *May 28, 2024

(54) SYSTEMS AND METHODS EMPLOYING NEW EVOLUTION SCHEDULES IN AN ANALOG COMPUTER WITH APPLICATIONS TO DETERMINING ISOMORPHIC GRAPHS AND POST-PROCESSING SOLUTIONS

(71) Applicant: D-WAVE SYSTEMS INC., Burnaby (CA)

(72) Inventors: Mohammad H. S. Amin, Burnaby (CA); Mark W. Johnson, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 979 days.

This patent is subject to a terminal disclaimer.

(21) Appl. No.: 16/936,742

(22) Filed: Jul. 23, 2020

(65) Prior Publication Data
US 2020/0356889 A1 Nov. 12, 2020

Related U.S. Application Data

(63) Continuation of application No. 14/734,924, filed on Jun. 9, 2015, now Pat. No. 10,769,545.

(Continued)

(51) Int. Cl.
G06N 10/00 (2022.01)
(52) U.S. Cl.
CPC .................... *G06N 10/00* (2019.01)
(58) Field of Classification Search
CPC .......... G06N 10/00; G06N 5/01; G06N 20/00; G06N 7/01; G06N 3/047; G06N 10/40;
(Continued)

(56) References Cited

U.S. PATENT DOCUMENTS 6,838,694 B2 1/2005 Esteve et al.
7,135,701 B2 11/2006 Amin et al.
(Continued)

FOREIGN PATENT DOCUMENTS

CA 2724617 C 2/2017
CN 101088102 A 12/2007
(Continued)

OTHER PUBLICATIONS

"Forward and backward time observables for quantum evolution and quantum stochastic processes—I: The time observables" Y. Strauss Department of Mathematics Ben-Gurion University of the negev (Year: 2007).*

(Continued)

*Primary Examiner* — Luis A Sitiriche
(74) *Attorney, Agent, or Firm* — Cozen O'Connor

(57) ABSTRACT

A second problem Hamiltonian may replace a first problem Hamiltonian during evolution of an analog processor (e.g., quantum processor) during a first iteration in solving a first problem. This may be repeated during a second, or further successive iterations on the first problem, following re-initialization of the analog processor. An analog processor may evolve under a first non-monotonic evolution schedule during a first iteration, and second non-monotonic evolution schedule under second, or additional non-monotonic evolution schedule under even further iterations. A first graph and second graph may each be processed to extract final states versus a plurality of evolution schedules, and a determination made as to whether the first graph is isomorphic with respect to the second graph. An analog processor may evolve by decreasing a temperature of, and a set of quantum fluctuations, within the analog processor until the analog processor reaches a state preferred by a problem Hamiltonian.

8 Claims, 13 Drawing Sheets

Related U.S. Application Data

(60) Provisional application No. 62/013,393, filed on Jun. 17, 2014.

(58) Field of Classification Search
CPC .......... G06N 3/045; G06N 3/08; G06N 99/00;
G06N 3/044; G06N 3/088; G06N 10/20;
G06N 10/60; G06N 3/084; G06N 3/12;
G06N 5/02; G06N 5/04; G06N 7/08;
G06N 10/80; G06N 3/00; G06N 5/046;
G06N 20/10; G06N 20/20; G06N 3/042;
G06N 3/06; G06N 3/086; G06N 3/126;
G06N 5/022; G06N 5/045
See application file for complete search history.

(56) References Cited

U.S. PATENT DOCUMENTS

| | | |
|---|---|---|
| 7,418,283 B2 | 8/2008 | Amin |
| 7,533,068 B2 | 5/2009 | Maassen et al. |
| 7,624,088 B2 | 11/2009 | Johnson et al. |
| 7,800,395 B2 | 9/2010 | Johnson et al. |
| 7,843,209 B2 | 11/2010 | Berkley |
| 7,877,333 B2 | 1/2011 | Macready |
| 7,898,282 B2 | 3/2011 | Harris et al. |
| 8,098,179 B2 | 1/2012 | Bunyk et al. |
| 8,139,656 B2 | 3/2012 | Shental et al. |
| 8,195,596 B2 | 6/2012 | Rose et al. |
| 8,195,726 B2 | 6/2012 | Macready et al. |
| 8,229,863 B2 | 7/2012 | Amin et al. |
| 8,244,662 B2 | 8/2012 | Coury et al. |
| 8,283,943 B2 | 10/2012 | Van Den Brink et al. |
| 8,446,842 B2 | 5/2013 | Cao et al. |
| 8,494,993 B2 | 7/2013 | Harris et al. |
| 8,536,566 B2 | 9/2013 | Johansson et al. |
| 8,560,282 B2 | 10/2013 | Love et al. |
| 8,611,974 B2 | 12/2013 | Maibaum et al. |
| 8,655,828 B2 | 2/2014 | Rose |
| 8,700,689 B2 | 4/2014 | Macready et al. |
| 8,892,857 B2 | 11/2014 | Ozols et al. |
| 8,977,576 B2 | 3/2015 | Macready |
| 9,015,215 B2 | 4/2015 | Berkley et al. |
| 9,026,574 B2 | 5/2015 | Macready et al. |
| 9,178,154 B2 | 11/2015 | Bunyk |
| 9,396,440 B2 | 7/2016 | Macready et al. |
| 9,647,662 B1 | 5/2017 | Abutaleb et al. |
| 10,275,422 B2 | 4/2019 | Israel et al. |
| 10,769,545 B2 | 9/2020 | Amin et al. |
| 11,138,511 B2 | 10/2021 | Yarkoni et al. |
| 2003/0140019 A1 | 7/2003 | Gutta et al. |
| 2005/0082519 A1 | 4/2005 | Amin et al. |
| 2005/0273306 A1 | 12/2005 | Hilton et al. |
| 2006/0123363 A1 | 6/2006 | Williams et al. |
| 2006/0147154 A1 | 7/2006 | Thom et al. |
| 2006/0151775 A1 | 7/2006 | Hollenberg et al. |
| 2006/0225165 A1 | 10/2006 | Maassen et al. |
| 2006/0248618 A1 | 11/2006 | Berkley |
| 2007/0080341 A1 | 4/2007 | Macready et al. |
| 2007/0174227 A1 | 7/2007 | Johnson et al. |
| 2007/0179760 A1 | 8/2007 | Smith |
| 2007/0180586 A1 | 8/2007 | Amin |
| 2007/0239366 A1 | 10/2007 | Hilton et al. |
| 2008/0052055 A1 | 2/2008 | Rose et al. |
| 2008/0109500 A1 | 5/2008 | Macready et al. |
| 2008/0162613 A1 | 7/2008 | Amin |
| 2008/0176750 A1 | 7/2008 | Rose et al. |
| 2008/0215850 A1 | 9/2008 | Berkley et al. |
| 2008/0238531 A1 | 10/2008 | Harris |
| 2008/0274898 A1 | 11/2008 | Johnson et al. |
| 2008/0319964 A1 | 12/2008 | Coury et al. |
| 2009/0078931 A1 | 3/2009 | Berkley |
| 2009/0082209 A1 | 3/2009 | Bunyk et al. |
| 2009/0121215 A1 | 5/2009 | Choi |
| 2009/0299947 A1 | 12/2009 | Amin et al. |
| 2013/0067181 A1 | 3/2013 | Boldyrev et al. |
| 2014/0097405 A1 | 4/2014 | Bunyk |
| 2014/0250288 A1 | 9/2014 | Roy |
| 2014/0297247 A1 | 10/2014 | Troyer et al. |
| 2019/0124530 A1 | 4/2019 | McKibben |
| 2023/0316094 A1 | 10/2023 | Farré Pérez et al. |

FOREIGN PATENT DOCUMENTS

| | | |
|---|---|---|
| CN | 102037475 B | 5/2015 |
| JP | 5400872 B2 | 11/2013 |
| WO | 2005093649 A1 | 10/2005 |
| WO | 2005122052 A1 | 12/2005 |
| WO | 2007085074 A1 | 8/2007 |
| WO | 2007147243 A1 | 12/2007 |
| WO | 2008006217 A1 | 1/2008 |
| WO | 2008138100 A1 | 11/2008 |
| WO | 2009120638 A2 | 10/2009 |
| WO | 2009143166 A2 | 11/2009 |

OTHER PUBLICATIONS

Feld., "A Hybrid Solution Method for the Capacitated Vehicle Routing Problem Using a Quantum Annealer", Frontiers in ICT, Jun. 2019, vol. 6 Article 13, 13 pages.

Goodfellow et al., "Generative Adversarial Nets", arXiv:1406.2661v1 [stat.ML], 9 pages, Jun. 10, 2014.

Syrichas, et al.., "Large-scale vehicle routing problems: Quantum Annealing, tunings and results", Computers and Operations Research 87 (2017) 52-62.

Bass, G. et al, "Heterogeneous Quantum Computing for Satellite Constellation Optimization: Solving the Weighted K-Clique Problem", arXiv:1709.05381v3, May 20, 2018. 17 pages.

Castro, "Tightening Pieewise McCormick Relaxations for Bilinear Problems", Computers and Chemical Engineering 72 (2015) 300-311, Apr. 5, 2014.

Crainic et al., "Extreme Point-Based Heuristics for Three-Dimensional Bin Packing", CIRRELT, Oct. 2007. [Online]. Available: https://www.cirrelt.ca/documentstravail/cirrelt-2007-41.pdf.

Fowler et al., "A Survey of Scheduling With Parallel Batch (p-batch) Processing", Eurpoean Journal of Operational Research 298 (2022) 1-24, Jun. 19, 2021.

Gonacalves et al., "A Biased Random Key Genetic Algorithm for 2D and 3D Bin Packing Problems", Int. J. Production Economics 145 (2013) 500-510, Apr. 18, 2013.

Hen et al., "Probing for Quantum Speedup in Spin Glass Problems with Planted Solutions", arXiv:1502.01663v3, Nov. 2, 2015.

Lu et al., "Imbalance in the Cloud: an Analysis on Alibaba Cluster Tree", 2017 IEEE International Conference on Big Data, 2017.

Paquay, "A Mixed Integer Programming Formulation for the Three Dimensional Bin Packing Problem Deriving from an Air Cargo Application", Jun. 3, 2014.

Pfau et al., "Connecting Generative Adversarial Networks and Actor-Critic Methods", arXiv:1610.01945v3, Jan. 18, 2017.

Van Dongen et al., "Metric Distances Derived from Cosine Similarity and Pearson and Spearman Correlations", arXiv:1208.3145v1, Aug. 14, 2012.

Wang et al., "Research and Implementation of Scheduling Strategy in Kubernetes for Computer Science Laboratory in Universities", Information 2021. [Online]. Available: https://doi.org/10.3390/info12010016.

Wikipedia, "K-d tree", Oct. 13, 2022.

Zhu, Zheng, et al., "Efficient Cluster Algorithm for Spin Glasses in Any Space Dimension", arXiv:1501.05630v2 [cond-mat.dis-nn] Aug. 15, 2015, 5 pages.

Kasi, et al., "A Cost and Power Feasibility Analysis of Quantum Annealing for NextG Cellular Wireless Networks", arXiv:2109.01465v3 [cs.NI] Jan. 14, 2022, 14 pages.

Kasi, et al., "Towards Quantum Belief Propagation for LDPC Decoding in Wireless Networks", arXiv:2007.11069v2 [cs.NI] Sep. 19, 2020, 14 pages.

Kim, et al., "Physics-Inspired Heuristics for Soft MIMO Detection in 5G New Radio and Beyond", arXiv:2103.10561v1 [cs.NI] Mar. 18, 2021.

(56) References Cited

OTHER PUBLICATIONS

Raymond, et al., "Improving performance of logical qubits by parameter tuning and topology compensation", arXiv:2006.04913v2 [quant-ph] Aug. 6, 2020, 11 pages.
Cordella et al., "A (Sub)Graph Isomorphism Algorithm for Matching Large Graphs," IEEE Transactions on Pattern Analysis and Machine Intelligence 26(10):1367-1372, 2004.
Das et al., "Quantum Annealing and Analog Quantum Computation," arXiv:0801.2193v3, Mar. 24, 2008, 22 pages.
Dickson et al., "Thermally assisted quantum annealing of a 16-qubit problem," Nature Communications 4:1903, 2013, 6 pages.
Douglas et al., "Classical approach to the graph isomorphism problem using quantum walks," arXiv:0705.2531v2, Mar. 26, 2008, 22 pages.
Farhi et al., "Quantum Adiabatic Evolution Algorithms with Different Paths," arXiv:quant-ph/0208135v1, Aug. 21, 2002, 10 pages.
Finnila et al., "Quantum Annealing: A New Method for Minimizing Multidimensional Functions," arXiv:chem-ph/9404003v2, Jun. 3, 1994, 14 pages.
Gaitan et al., "Graph isomorphism and adiabatic quantum computing," arXiv:1304.5773v2, Feb. 12, 2014, 22 pages.
Hen et al., "Solving the Graph Isomorphism Problem with a Quantum Annealer," arXiv:1207.1712v2, Aug. 8, 2012, 9 pages.
Johnson et al., "Quantum annealing with manufactured spins," Nature 473:194-198, May 12, 2011.
Johnson et al., "Supplementary Information: Quantum annealing with manufactured spins," Nature 473:s1-s20, May 12, 2011.
Kadowaki et al., "Quantum Annealing in the Transverse Ising Model," arXiv:cond-mat/9804280v1, Apr. 25, 1998, 23 pages.
Lucas, "Ising formulations of many NP problems," Frontiers in Physics 2:Article 5, Feb. 12, 2014, 15 pages.
Morita, "Faster Annealing Schedules for Quantum Annealing," Journal of the Physical Society of Japan 76(10): Article 104001, Oct. 2007, 4 pages.
Ullman, "An Algorithm for Subgraph Isomorphism," Journal of the Association for Computing Machinery 23(1):31-42, Jan. 1976.
Vinci et al., "Hearing the Shape of the Ising Model with a Programmable Superconducting-Flux Annealer," arXiv:1307.1114v2, Sep. 17, 2014, 13 pages.
Burton et al., "Event-Dependent Control of Noise Enhances Learning in Neural Networks," Neural Networks 5:627-637, 1992.
Harris et al., "A Compound Josephson Junction Coupler for Flux Qubits with Minimal Crosstalk," arXiv:0904.37841 [cond-mat.supr-con] Apr. 24, 2009, 4 pages.
Harris et al., "Sign and Magnitude Tunable Coupler for Superconducting Flux Qubits," DWAVE/Coupler-10, arXiv: cond-mat/0608253v1 [cond-mat.supr-con] Aug. 11, 2006, 5 pages.
Maryak et al., "Efficient Global Optimization Using SPSA," Proceedings of the American Control Conference, San Diego, California, Jun. 1999, 5 pages.
Rose et al., "An Introduction to Quantum Annealing," DWAVE/Technical Document 0712, Aug. 10, 2007, 3 pages.
Rujan, P., "Searching for Optimal Configurations by Simulated Tunneling," Z. Phys. B—Condensed Matter, 73:391-416, 1988.
Suzuki et al., "Quantum Ferromagnetic Annealing," Physica E: Low-dimensional Systems and Nanostructures, 40(2):367-370, Dec. 2007.
Van den Brink et al., "Mediated Tunable Coupling of Flux Qubits," New Journal of Physics, 7(230), 2005, 18 pages.
"Simulated Annealing" Microsoft Documents, https://docs.microsoft.com/en-us/azure/quantum/optimization-simulated-annealing#parameter-free-simulated-annealing-cpu, Feb. 1, 2021 (retrieved Jun. 22, 2021).
Choi, Vicky. "Minor-embedding in adiabatic quantum computation: I. The parameter setting problem." Quantum Information Processing 7.5 (2008): 193-209. (Year: 2008).
King et al., "Observation of topological phenomena in a programmable lattice of 1,800 qubits", arXiv:1803.02047 [quant-ph], Mar. 6, 2018, 17 pages.
Makhlin et al., "Quantum-state engineering with Josephson-junction devices," Reviews of Modern Physics 73(2):357-400, Apr. 2001.
Nielsen et al., Quantum Computation and Quantum Information, Cambridge University Press, Cambridge, 2000, "7.8 Other implementation schemes," pp. 343-345.
Venturelli et al., "Quantum Annealing Implementation of Job-Shop Scheduling," arXiv:1506.08479v1 [quant-ph] Jun. 29, 2015, 16 pages.
Gallop, et al., "SQUIDs and their applications," Journal of Physics E: Scientific Instruments 9(6):417-429, 1976.
Ibrahim, Zuwairie, "Solving Unconstraint Assignment Problem by a Molecular-Based Computing Algorithm", IEEE, 2004 (Year: 2004).
Kleiner, et al., "Superconducting Quantum Interference Devices: State of the Art and Applications," Proceedings of the IEEE 92(10): 1534-1548, 2004.
Orivati, Andrea, Our Top 10 Patent Picks From 2019. InQuartik. Retrieved, May 29, 2020. https://www.inquartik.com/inqo-2019-most-important-patents/.
Teller, Carston, "Functional nucleic acid nanostructures and DNA machines", Science Direct, 2010 (Year: 2010).
Mulligan, et al., "Designing Peptides on a Quantum Computer", bioRxiv preprint first posted online Sep. 2, 2019; doi: http://dx.doi.org/10.1101/752485, 20 pages.
Aonishi, et al., "Statistical mechanics of CDMA multiuser detector implemented in coherent lssing machine", Journal of Applied Physics, 124, 233102 (2008), 10 pages.
Kadin, et al., "Effects of Superconducting Return Currents on RSFQ Circuit Performance", IEEE Transactions on Applied Superconductivity, vol. 15 No. 2 Jun. 2005, 4 pages.
Otsubo, et al., "Code-division multiple-access multiuser demodulator by using quantum fluctuations", Physical Review E 90, 012126 (2014), 16 pages.
Pinheiro, et al., "Magnetic flux avalanches in Nb/NbN thin films", Low Temp. Phys. 46, 365 (2020), 8 pages.
Raymond, et al., "Sparsely-Spread CDMA—a statistical mechanics based analysis.", PACS Nos. 64.60.cu, 75.10 Nr, 84.40.Ua, 89.70.+c.
Zhang, et al., "Quantum internet using code division multiple access", Scientific Reports, 3:2211, DOI: 10.1038/srep02211, 2013, 7 pages.
Amin et al., "First Order Quantum Phase Transition in Adiabatic Quantum Computation", arXiv:0904.1387v3, Dec. 15, 2009, 5 pages.
Amin et al., "Thermally assisted adiabatic quantum computation," arXiv:cond-mat/0609332v2, pp. 1-5, (Mar. 2, 2007) Feb. 1, 2008.
Crowley, et al., "Quantum and Classical in Adiabatic Computation", rXiv:1405.5185v1 [quant-ph] May 20, 2014, 9 pages.
DelaFuente Ruiz, "Quantum annealing", http://www.linkedin.com/in/alfonsofr, 2014, 21 pages.
Morita, et al., "Quantum-thermal annealing with cluster-flip algorithm", arXiv:0903.2206v2 [cond-mat.dis-nn] Jun. 8, 2009, 4 pages.
Shu, et al., "Hybrid Quantum Anneal for Clustering Problems", arXiv:1104.3246v1 [cond-mat.dis-nn] Apr. 16, 2011, 24 pages.
Vinci, et al., "Distinguishing Classical and Quantum Models for the D-Wave Device", arXiv:1403.4228v1 [quant-ph] Mar. 17, 2014, 29 pages.
Kurihara, et al. "Quantum Annealing for Clustering", arXiv:0905.3527v2 [cond-mat.dis-nn], May 28, 2009, pp. 1-9.
Dickson, Neil G, et al., "Algorithmic approach to adiabitic quantum optimization", Physical Review A, arXiv:1108.3303v1 [puant-ph] Aug. 16, 2011, 7 pages.
Farhi, Edward, et al., "Quantum Adiabatic Algorithms, Small Gaps, and Different Paths", Physical Review E, arXiv:0909.4766v2 [quant-ph], Jun. 4, 2010, 45 pages.
Baranwal, et al., "Distributed Optimization in Fixed-Time", arXiv:1905.10472vcs.SY] May 24, 2019, 14 pages.
Juan, et al., "Using Mutli-Start Randomized Heuristics to solve Non-Smooth and Non-Convex Optimization Problems", Conference on Numerical Optimization and Applications in Engineering, Oct. 12-15, 2010, 278 pages.

(56) References Cited

OTHER PUBLICATIONS

Mitra, et al., "Convergence and Finite-Time Behavior of Simulated Annealing", Memorandum No. UCB/ERL M85/23, Mar. 20, 1985.
Zeeshan, et al., "Meta-heuristic approach for the conceptual design and optimization of multistage interceptor", 18th World IMACS / MODSIM Congress, Cairns, Australia Jul. 13-17, 2009 http://mssanz.org.au/modsim09, 7 pages.

* cited by examiner

SYSTEMS AND METHODS EMPLOYING NEW EVOLUTION SCHEDULES IN AN ANALOG COMPUTER WITH APPLICATIONS TO DETERMINING ISOMORPHIC GRAPHS AND POST-PROCESSING SOLUTIONS

BACKGROUND

Field

This disclosure generally relates to devices, and architectures for quantum instruments comprising quantum devices and techniques for operating the same.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are not binary digits (bits) but typically are quantum binary digits or qubits. Quantum computers hold the promise of providing exponential speedup for certain classes of computation problems like simulating quantum physics. Useful speedup may exist for other classes of problems.

There are several types of quantum computers. An early proposal from Feynman in 1981 included creating artificial lattices of spins. More complicated proposals followed including a quantum circuit model where logical gates are applied to qubits in a time ordered way. In 2000, a model of computing was introduced for solving satisfiability problems; based on the adiabatic theorem this model is called adiabatic quantum computing. This model is believed useful for solving hard optimization problems and potentially other problems. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, as a source of delocalization to reach a global energy minimum more accurately and/or more quickly than classical annealing. In quantum annealing thermal effects and other noise may be present. The final low-energy state may not be the global energy minimum.

Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of delocalization, sometimes called disorder, during the annealing process. The computational problem is encoded in a Hamiltonian $H_P$, and the method introduces quantum effects by adding a delocalization Hamiltonian $H_D$ that does not commute with $H_P$. An example case is:

$$H_E \propto A(t)H_D + B(t)H_P \quad (1)$$

where $A(t)$ and $B(t)$ are time dependent envelope functions. For example, $A(t)$ changes from a large value to substantially zero during the evolution. The Hamiltonian $H_E$ may be thought of as an evolution Hamiltonian similar to $H_e$ described in the context of adiabatic quantum computation above. The delocalization may be removed by removing $H_D$ (i.e., reducing $A(t)$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution, or approximate solution, to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

BRIEF SUMMARY

Graph Isomorphism

Two graphs are isomorphic if there is a correspondence between the vertices of a first graph and the vertices of a second graph where the first graph can be transformed to the second graph by relabeling the vertices. That is, the correspondence recognizes and preserves the structure of each graph. More formally, a pair of graphs, for example G and H, is isomorphic if there is a one-to-one correspondence between their vertices. This correspondence has the property that an edge between two vertices exists in one graph if and only if an edge exists between the corresponding two vertices in the other graph. If the graphs G and H are isomorphic this is denoted G≈H.

The graph isomorphism problem is a computational decision problem of determining whether two graphs are isomorphic. The graph isomorphism problem is known to be in NP, but not known to belong to either of its well-known subsets: P and NP-complete. While the graph isomorphism problem is of theoretical interest it also is of practical importance. For example, solutions to the problem can be used to identify a chemical compound within a chemical database, verify electronic circuits, and other applications.

No efficient method for determining graph isomorphism is known to Applicants. The best classical methods are exponential in the square root of n log n, where n is the graph size. Some special cases of graph isomorphism have efficient solutions. However, in general this is a hard problem. Graph isomorphism determination methods based on the quantum gate model exist but is unknown if they are efficient.

A non-transitory computer-readable storage medium containing processor-executable instructions, which when executed cause at least one processor to: for a first computational problem, during a first iteration on the first computational problem: initialize an analog processor to a first initial state; cause the analog processor to evolve for a first time period from the initial state toward a first problem Hamiltonian; replace the first problem Hamiltonian with a second problem Hamiltonian, wherein a ground state to the second problem Hamiltonian approximates the ground state of the first computational problem; continue to evolve the analog processor toward a first final state determined by the second problem Hamiltonian; and read out the first final state thereby determining a first result of the first computational problem.

The processor-executable instructions when executed may further cause the at least one processor to: for the first computational problem, during a second iteration on the first computational problem, the second iteration different from the first iteration: re-initialize the analog processor to a second initial state; cause the analog processor to re-evolve for a second time period from the second initial state toward the first problem Hamiltonian; replace the first problem Hamiltonian with the second problem Hamiltonian, wherein the ground state to the second problem Hamiltonian approximates the ground state of the first computational problem; continue to re-evolve the analog processor toward a second final state determined by the second problem Hamiltonian; and read out the second final state thereby determining a second result of the first computational problem.

The processor-executable instructions when executed may further cause the at least one processor to: record the first result and a value correlated with the first time period; and record the second result and a value correlated with the second time period.

The processor-executable instructions when executed may further cause the at least one processor to: return the first result and a value correlated with the first time period; and return the second result and a value correlated with the second time period.

The analog processor may include a plurality of quantum devices, a plurality of local bias devices, and a plurality of couplers, and wherein the processor-executable instructions when executed may further cause the at least one processor to: set a local bias value for each local bias device in the plurality of local bias devices wherein each local bias device in the plurality of local bias devices biases a respective quantum device in the plurality of quantum devices; and set a coupling value for each coupling device in the plurality of couplers, wherein each coupler in the plurality of couplers tunably couples a pair of quantum devices in the plurality of quantum devices. The first problem Hamiltonian and the second problem Hamiltonian may differ by a plurality of single qubit terms. The first problem Hamiltonian and the second problem Hamiltonian may differ by a plurality of two qubit terms.

A non-transitory computer-readable storage medium containing processor-executable instructions, which when executed cause at least one processor to: for a first computational problem defined by a problem Hamiltonian, during a first iteration on the first computational problem: initialize an analog processor to a first state; evolve the analog processor under a first non-monotonic evolution schedule; and read out a first final state of the analog processor.

The processor-executable instructions when executed may further cause the at least one processor to: for the first computational problem defined by the first problem Hamiltonian, during a second iteration on the first computational problem, the second iteration different from the first iteration: re-initialize an analog processor to the first state; evolve the analog processor under a second non-monotonic evolution schedule, wherein the instructions to evolve the analog processor under a second non-monotonic evolution schedule include instructions to evolve the analog processor for a third time period in the first direction; and read out a second final state of the analog processor. To evolve the analog processor under the first non-monotonic evolution schedule the processor-executable instructions may cause the at least one processor to: cause the analog processor to evolve for a first time period in a first direction; and cause the analog processor to evolve for a second time period in a second direction, wherein the first direction and the second direction are opposite. To evolve the analog processor under the first non-monotonic evolution schedule the processor-executable instructions may cause the at least one processor to: cause the analog processor to evolve for a third time period in a first direction; and cause the analog processor to evolve for a fourth time period in a second direction, wherein the first direction and the second direction are opposite. The processor-executable instructions when executed may cause the at least one processor to: return the first final state with a first value associated with the first non-monotonic evolution schedule; and return the second final state with a second value associated with the second non-monotonic evolution schedule. The first non-monotonic evolution schedule may be a linear evolution schedule. The first non-monotonic evolution schedule may be a non-linear evolution schedule. The processor-executable instructions when executed may cause the at least one processor to: prior to initializing the analog processor to the first state, initialize the analog processor to a zeroth state via application of a local bias value to a plurality of quantum devices in the analog processor; and evolve the analog processor to the first state under an instant Hamiltonian that includes a problem Hamiltonian wherein: the problem Hamiltonian has no local biases on the plurality of quantum devices, and the problem Hamiltonian has no couplings between the devices in the plurality of quantum devices.

The analog processor may include a plurality of quantum devices, a plurality of local bias devices, and a plurality of couplers, and wherein the processor-executable instructions when executed may further cause the at least one processor to: set a local bias value for each local bias device in the plurality of local bias devices wherein each local bias device in the plurality of local bias devices biases a respective quantum device in the plurality of quantum devices; and set a coupling value for each coupler in the plurality of couplers, wherein each coupler in the plurality of couplers tunably couples a pair of quantum devices in the plurality of quantum devices.

A non-transitory computer-readable storage medium containing processor-executable instructions, which when executed cause at least one processor to: receive a first graph and a second graph; process the first graph to extract a first plurality of final states versus a plurality of evolution schedules; process the second graph to extract a second plurality of final states versus the plurality of evolution schedules; determine if the first graph is isomorphic to the second graph; and return the determination. The processor-executable instructions when executed may cause the at least one processor to: select a non-monotonic evolution schedule to include in the plurality of evolution schedules. The processor-executable instructions when executed may cause the at least one processor to: select an evolution schedule to include in the plurality of evolution schedules, wherein the evolution schedule is characterized by a time-dependent problem Hamiltonian.

The first graph may include a first number of vertices, a first number of edges, and a first characteristic matrix, and the second graph may include a second number of vertices, a second number of edges, and a second characteristic matrix, wherein the processor-executable instructions when executed further may cause the at least one processor to preprocess the first graph and the second graph by a comparison technique selected from the group consisting of: comparison of the first number of vertices of the first graph and the second number of vertices of the second graph; comparison of the first number of edges of the first graph and the second number of edges of the second graph; comparison of a number of the edges incident on each vertex in the first graph and a number of the edges incident on each vertex in the second graph; and comparison of a first spectrum of a set of eigenvalues of the first characteristic matrix for first graph and a second spectrum of a set of eigenvalues of the second characteristic matrix for second graph. The processor-executable instructions when executed may cause the at least one processor to: create a first problem Hamiltonian to for the first graph, wherein the first problem Hamiltonian is symmetric with respect to permutations of a qubit index in the first problem Hamiltonian; and create a second problem Hamiltonian to for the first graph, wherein the second problem Hamiltonian is symmetric with respect to permutations of a qubit index in the second problem Hamiltonian.

A system for use in quantum processing may be summarized as including: at least one non-transitory processor-readable medium that stores at least one of processor executable instructions or data; and at least one processor communicatively coupled to the least one non-transitory processor-readable medium, and which, in response to execution of the at least one of processor executable instructions or data: for a first computational problem, during a first iteration on the first computational problem: initializes an analog processor to a first initial state; causes the analog processor to evolve for a first time period from the initial state toward a first state preferred by a first problem Hamiltonian; replaces the first problem Hamiltonian with a second problem Hamiltonian, wherein a ground state to the second problem Hamiltonian approximates the ground state of the first computational problem; continues to evolve the analog processor toward a first final state preferred by the second problem Hamiltonian; and reads out the first final state thereby determining a first result of the first computational problem.

In response to execution of the at least one of processor executable instructions or data, the at least one processor: for the first computational problem, during a second iteration on the first computational problem, the second iteration different from the first iteration: may re-initialize the analog processor to a second initial state; may cause the analog processor to re-evolve for a second time period from the second initial state toward a second state preferred by the first problem Hamiltonian; may replace the first problem Hamiltonian with the second problem Hamiltonian, wherein the ground state to the second problem Hamiltonian approximates the ground state of the first computational problem; may continue to re-evolve the analog processor toward a second final state preferred by the second problem Hamiltonian; and may read out the second final state thereby determining a second result of the first computational problem. In response to execution of the at least one of processor executable instructions or data, the at least one processor: may record the first result and a value correlated with the first time period; and may record the second result and a value correlated with the second time period. In response to execution of the at least one of processor executable instructions or data, the at least one processor: may return the first result and a value correlated with the first time period; and may return the second result and a value correlated with the second time period. The analog processor may include: a plurality of quantum devices; a plurality of local bias devices to provide controllable local biases to the plurality of quantum devices; and a plurality of couplers to provide controllable communicative coupling between respective pairs of quantum devices in the plurality of quantum devices. In response to execution of the at least one of processor executable instructions or data, the at least one processor: may set a local bias value for each local bias device in the plurality of local bias devices; and may set a coupling value for each coupler in the plurality of couplers. The first problem Hamiltonian and the second problem Hamiltonian may differ by a plurality of single qubit terms. The first problem Hamiltonian and the second problem Hamiltonian may differ by a plurality of two qubit terms.

A computational method may be summarized as including: for a first computational problem, during a first iteration on the first computational problem: initializing of an analog processor to a first initial state, by at least one processor; causing the analog processor to evolve for a first time period from the initial state toward a first state preferred by a first problem Hamiltonian, by at least one processor; replacing the first problem Hamiltonian with a second problem Hamiltonian, wherein a ground state to the second problem Hamiltonian approximates the ground state of the first computational problem, by at least one processor; continuing to evolve the analog processor toward a first final state preferred by the second problem Hamiltonian, by at least one processor; and reading out the first final state thereby determining a first result of the first computational problem, by at least one processor.

The method may further include: for the first computational problem, during a second iteration on the first computational problem, the second iteration different from the first iteration: causing the re-initialization of the analog processor to a second initial state, by at least one processor; causing the analog processor to re-evolve for a second time period from the second initial state toward a second state preferred by the first problem Hamiltonian, by at least one processor; replacing the first problem Hamiltonian with the second problem Hamiltonian, wherein the ground state to the second problem Hamiltonian approximates the ground state of the first computational problem, by at least one processor; continuing to re-evolve the analog processor toward a second final state preferred by the second problem Hamiltonian, by at least one processor; and reading out the second final state thereby determining a second result of the first computational problem, by at least one processor. The method may further include: recording the first result and a value correlated with the first time period, by at least one processor; and recording the second result and a value correlated with the second time period, by at least one processor. The method may further include: returning the first result and a value correlated with the first time period, by at least one processor; and returning the second result and a value correlated with the second time period, by at least one processor. The analog processor may include a plurality of quantum devices, a plurality of local bias devices to provide controllable local biases to the plurality of quantum devices, and a plurality of couplers to provide controllable communicative coupling between respective pairs of quantum devices in the plurality of quantum devices; and the method may further include: setting a local bias value for each local bias device in the plurality of local bias devices, by at least one processor; and setting a coupling value for each coupler in the plurality of couplers, by at least one processor. The first problem Hamiltonian and the second problem Hamiltonian may differ by a plurality of single-qubit terms. The first problem Hamiltonian and the second problem Hamiltonian may differ by a plurality of two-qubit terms.

A system for use in quantum processing may be summarized as including: at least one non-transitory processor-readable medium that stores at least one of processor executable instructions or data; and at least one processor communicatively coupled to the least one non-transitory processor-readable medium, and which, in response to execution of the at least one of processor executable instructions or data: for a first computational problem defined by a problem Hamiltonian, during a first iteration on the first computational problem: initializes an analog processor to a first state; evolves the analog processor under a first non-monotonic evolution schedule; and reads out a first final state of the analog processor.

In response to execution of the at least one of processor executable instructions or data, the at least one processor: for the first computational problem defined by the first problem Hamiltonian, during a second iteration on the first computational problem, the second iteration different from the first iteration: may re-initialize an analog processor to the first state; may evolve the analog processor under a second non-monotonic evolution schedule; and may read out a second final state of the analog processor. In response to execution of the at least one of processor executable instructions or data, the at least one processor: may return the first final state with a first value associated with the first non-monotonic evolution schedule; and may return the second final state with a second value associated with the second non-monotonic evolution schedule. To evolve the analog processor under the first non-monotonic evolution schedule the at least one processor: may cause the analog processor to evolve for a first time period in a first direction; and may cause the analog processor to evolve for a second time period in a second direction, wherein the first direction and the second direction are opposite. To evolve the analog processor under the first non-monotonic evolution schedule the at least one processor: may cause the analog processor to evolve for a third time period in a first direction. The first non-monotonic evolution schedule may be a linear evolution schedule. The first non-monotonic evolution schedule may be a non-linear evolution schedule. In response to execution of the at least one of processor executable instructions or data, the at least one processor: prior to initializing the analog processor to the first state, may initialize the analog processor to a zeroth state via application of a local bias value to a plurality of quantum devices in the analog processor; and may evolve the analog processor to the first state under an instant Hamiltonian that includes a problem Hamiltonian wherein: the problem Hamiltonian has no local biases on the plurality of quantum devices, and the problem Hamiltonian has no couplings between the devices in the plurality of quantum devices. The analog processor may include a plurality of quantum devices, a plurality of local bias devices to provide controllable local biases to the plurality of quantum devices, and a plurality of couplers to provide controllable communicative coupling between respective pairs of quantum devices in the plurality of quantum devices, and wherein, in response to execution of the at least one of processor executable instructions or data, the at least one processor: may set a local bias value for each local bias device in the plurality of local bias devices; and may set a coupling value for each coupler in the plurality of couplers.

A computational method may be summarized as including: for a first computational problem defined by a problem Hamiltonian, during a first iteration by at least one processor on the first computational problem: initializing an analog processor to a first state; evolving the analog processor under a first non-monotonic evolution schedule; and reading out a first final state of the analog processor.

The method may further include: for the first computational problem defined by the first problem Hamiltonian, during a second iteration by at least one processor on the first computational problem, the second iteration different from the first iteration: re-initializing an analog processor to the first state; evolving the analog processor under a second non-monotonic evolution schedule; and reading out a second final state of the analog processor. The method may further include: returning the first final state with a first value associated with the first non-monotonic evolution schedule; and returning the second final state with a second value associated with the second non-monotonic evolution schedule. The method may further include: causing the analog processor to evolve for a first time period in a first direction, by at least one processor; and causing the analog processor to evolve for a second time period in a second direction, by at least one processor, wherein the second direction is opposite the first direction. The method may further include: causing the analog processor to evolve for a third time period in a first direction, by at least one processor. Evolving the analog processor under the first non-monotonic evolution schedule by at least one processor may include evolving the analog processor under a linear evolution schedule by at least one processor. Evolving the analog processor under the first non-monotonic evolution schedule by at least one processor may include evolving the analog processor under a non-linear evolution schedule by at least one processor. The method may further include: prior to initializing the analog processor to the first state, initializing the analog processor to a zeroth state via application of a local bias value to a plurality of quantum devices in the analog processor; and evolving the analog processor to the first state under an instant Hamiltonian that includes a problem Hamiltonian wherein: the problem Hamiltonian has no local biases on the plurality of quantum devices, and the problem Hamiltonian has no couplings between the devices in the plurality of quantum devices. The analog processor may include a plurality of quantum devices, a plurality of local bias devices to provide controllable local biases to the plurality of quantum devices, and a plurality of couplers to provide controllable communicative coupling between respective pairs of quantum devices in the plurality of quantum devices, the method may further include: setting a local bias value for each local bias device in the plurality of local bias devices, by at least one processor; and setting a coupling value for each coupler in the plurality of couplers, by at least one processor.

A system for use in quantum processing may be summarized as including: at least one non-transitory processor-readable medium that stores at least one of processor executable instructions or data; and at least one processor communicatively coupled to the least one non-transitory processor-readable medium, and which, in response to execution of the at least one of processor executable instructions or data: receives a first graph and a second graph; processes the first graph to extract a first plurality of final states versus a plurality of evolution schedules; processes the second graph to extract a second plurality of final states versus the plurality of evolution schedules; and determines if the first graph is isomorphic to the second graph.

In response to execution of the at least one of processor executable instructions or data, the at least one processor: may select a non-monotonic evolution schedule to include in the plurality of evolution schedules. In response to execution of the at least one of processor executable instructions or data, the at least one processor: may select an evolution schedule to include in the plurality of evolution schedules, wherein the evolution schedule is characterized by a time-dependent problem Hamiltonian. The first graph may include a first number of vertices, a first number of edges, and a first characteristic matrix, and the second graph may include a second number of vertices, a second number of edges, and a second characteristic matrix, wherein, in response to execution of the at least one of processor executable instructions or data, the at least one processor preprocesses the first graph and the second graph by a comparison technique selected from the group consisting of: comparison of the first number of vertices of the first graph and the second number of vertices of the second graph; comparison of the first number of edges of the first graph and the second number of edges of the second graph; comparison of a number of the edges incident on each vertex in the first graph and a number of the edges incident on each vertex in the second graph; and comparison of a first spectrum of a set of eigenvalues of the first characteristic matrix for first graph and a second spectrum of a set of eigenvalues of the second characteristic matrix for second graph. The processor-executable instructions when executed may further cause the at least one processor to: prior to processing the first graph and processing the first graph, pre-process the first graph and pre-process the second graph by a technique selected from the group consisting of: compare a first number vertices in the first graph to a second number edges in the second graph; compare a first number vertices in the first graph to a second number edges in the second graph; compare a first set of numbers corresponding to edges incident on each vertices in the first graph to a second set of numbers corresponding to edges incident on each vertices in the second graph; and compare the spectra of the first graph to the spectra of the second graph. In response to execution of the at least one of processor executable instructions or data, the at least one processor: may create a first problem Hamiltonian to for the first graph, wherein the first problem Hamiltonian is symmetric with respect to permutations of a qubit index in the first problem Hamiltonian; and may create a second problem Hamiltonian to for the first graph, wherein the second problem Hamiltonian is symmetric with respect to permutations of a qubit index in the second problem Hamiltonian. 60. In response to execution of the at least one of processor executable instructions or data, the at least one processor: may return a signal indicative of an outcome of the determination.

A computational method may be summarized as including: receiving, by a portion of at least one hybrid computer, a first graph and a second graph; processing the first graph, by the at least one hybrid computer, to extract a first plurality of final states versus a plurality of evolution schedules; processing the second graph, by the at least one hybrid computer, to extract a second plurality of final states versus the plurality of evolution schedules; determining, by the at least one hybrid computer, if the first graph is isomorphic to the second graph; and returning a signal indicative of an outcome of the determination.

The method may further include: selecting a non-monotonic evolution schedule to include in the plurality of evolution schedules. The method may further include: selecting an evolution schedule to include in the plurality of evolution schedules, wherein the evolution schedule is characterized by a time-dependent problem Hamiltonian. The first graph may include a first number of vertices, a first number of edges, and a first characteristic matrix, and the second graph may include a second number of vertices, a second number of edges, and a second characteristic matrix, wherein the method may further include preprocessing the first graph and the second graph by a comparison technique selected from the group consisting of: comparison of the first number of vertices of the first graph and the second number of vertices of the second graph; comparison of the first number of edges of the first graph and the second number of edges of the second graph; comparison of a number of the edges incident on each vertex in the first graph and a number of the edges incident on each vertex in the second graph; and comparison of a first spectrum of a set of eigenvalues of the first characteristic matrix for first graph and a second spectrum of a set of eigenvalues of the second characteristic matrix for second graph. The method may further include: creating a first problem Hamiltonian to for the first graph, wherein the first problem Hamiltonian is symmetric with respect to permutations of a qubit index in the first problem Hamiltonian; and creating a second problem Hamiltonian to for the first graph, wherein the second problem Hamiltonian is symmetric with respect to permutations of a qubit index in the second problem Hamiltonian.

A system for use in quantum processing may be summarized as including: at least one non-transitory processor-readable medium that stores at least one of processor executable instructions or data; and at least one processor communicatively coupled to the least one non-transitory processor-readable medium, and which, in response to execution of the at least one of processor executable instructions or data: for a first computational problem, during a first iteration of a plurality of iterations: receives a problem Hamiltonian for the first computational problem; receives an initial solution to the first computational problem; receives an evolution schedule; initializes an analog processor to a first final state based on the initial solution; causes the analog processor to evolve backwards within the evolution schedule from the initial solution towards a state preferred by an initial Hamiltonian reaching a first turning point; causes the analog processor to evolve forwards within the evolution schedule from the first turning point towards a second final state preferred by the problem Hamiltonian; and reads out the second final state thereby determining a second result of the first computational problem.

In response to execution of the at least one of processor executable instructions or data, the at least one processor: for the first computational problem, during a second iteration of the plurality of iterations, the second iteration different from the first iteration: may re-initialize an analog processor to the first final state based on the initial solution; may cause the analog processor to re-evolve backwards within the evolution schedule from the initial solution towards a state preferred by an initial Hamiltonian reaching a second turning point; may cause the analog processor to re-evolve forwards within the evolution schedule from the second turning point towards a third final state preferred by the problem Hamiltonian; and may read out the third final state thereby determining a third result of the first computational problem. In response to execution of the at least one of processor executable instructions or data, the at least one processor: may record the second result and a value correlated with the first turning point; and may record the third result and a value correlated with the second turning point. In response to execution of the at least one of processor executable instructions or data, the at least one processor: may return the second result and a value correlated with the first turning point; and may return the third result and a value correlated with the second turning point. The analog processor may include: a plurality of quantum devices; a plurality of local bias devices to provide controllable local biases to the plurality of quantum devices; and a plurality of couplers to provide controllable communicative coupling between respective pairs of quantum devices in the plurality of quantum devices.

A computational method may be summarized as including: receiving a problem Hamiltonian for a first computational problem; receiving an initial solution to the first computational problem; receiving an evolution schedule; for a first computational problem, during a first iteration of a plurality of iterations: initializing an analog processor to a first final state based on the initial solution; causing the analog processor to evolve backwards within the evolution schedule from the initial solution towards a state preferred by an initial Hamiltonian; causing the analog processor to evolve forwards within the evolution schedule from a first turning point towards a second final state preferred by the problem Hamiltonian; and reading out the second final state to determine a second result of the first computational problem.

The method may further include for the first computational problem, during a second iteration of the plurality of iterations, the second iteration different from the first iteration: re-initializing an analog processor to the first final state based on the initial solution; causing the analog processor to re-evolve backwards within the evolution schedule from the initial solution towards a state preferred by an initial Hamiltonian; causing the analog processor to re-evolve forwards within the evolution schedule from a second turning point towards a third final state preferred by the problem Hamiltonian; and reading out the third final state to determine a third result of the first computational problem. The method may further include: recording the second result and a value correlated with the first turning point; and recording the third result and a value correlated with the second turning point. The method may further include: returning the second result and a value correlated with the first turning point; and returning the third result and a value correlated with the second turning point.

A system for use in quantum processing may be summarized as including: at least one non-transitory processor-readable medium that stores at least one of processor executable instructions or data; and at least one processor communicatively coupled to the least one non-transitory processor-readable medium, and which, in response to execution of the at least one of processor executable instructions or data: for a first computational problem, during a first iteration on the first computational problem: initializes an analog processor to a first initial state; causes the analog processor to evolve from the initial state toward a first final state preferred by a problem Hamiltonian associated with the first computational problem for a first time period at a first rate; causes the analog processor evolve toward the first final state preferred by the problem Hamiltonian for a second time period at a second rate; and reads out the first final state thereby determining a first result of the first computational problem.

In response to execution of the at least one of processor executable instructions or data, the at least one processor: for the first computational problem, during a second iteration on the first computational problem, the second iteration different from the first iteration: may re-initialize the analog processor to a second initial state; may cause the analog processor to re-evolve from the second initial state toward a second final state determined by the problem Hamiltonian for a third time period; may cause the analog processor to re-evolve toward the second final state determined by the problem Hamiltonian for a fourth time period; and may read out the second final state thereby determining a second result of the first computational problem. In response to execution of the at least one of processor executable instructions or data, the at least one processor: may record the first result and a value correlated with the first time period; and may record the second result and a value correlated with the third time period. In response to execution of the at least one of processor executable instructions or data, the at least one processor: may return the first result and a value correlated with the first time period; and may return the second result and a value correlated with the second time period. The analog processor may include: a plurality of quantum devices; a plurality of local bias devices to apply local biases to the plurality of quantum devices; and a plurality of couplers to provide a controllable communicative coupling between respective pairs of quantum devices in the plurality of quantum devices. The processor-executable instructions when executed may further cause the at least one processor to: set a local bias value for each local bias device in the plurality of local bias devices; and set a coupling value for each coupler in the plurality of couplers. The second rate may exceed the first rate. The analog processor may include: a plurality of quantum devices and wherein the second time period may be shorter than the inverse of the tunneling rate of a quantum device in the plurality of quantum devices.

A computational method may be summarized as including: initializing an analog processor to a first initial state; causing the analog processor to evolve under a piecewise evolution schedule from the initial state toward a first final state preferred by a problem Hamiltonian; reading out the first final state; and returning a signal indicative of the first final state.

The method may further include: recording the first final state and a value correlated with the piecewise evolution schedule. The analog processor may include: a plurality of quantum devices; a plurality of local bias devices to provide controllable local biases to the plurality of quantum devices; and a plurality of couplers to provide controllable communicative coupling between respective pairs of quantum devices in the plurality of quantum devices; and the method may further include: setting a local bias value for each local bias device in the plurality of local bias devices, and setting a coupling value for each coupler in the plurality of couplers. The piecewise evolution schedule may include: evolving from the initial state toward the first final state preferred by the problem Hamiltonian for a first time period at a first rate;

and evolving toward the first final state preferred by the problem Hamiltonian for a second time period at a second rate.

A system for use in quantum processing may be summarized as including: at least one non-transitory processor-readable medium that stores at least one of processor executable instructions or data; and at least one processor communicatively coupled to the least one non-transitory processor-readable medium, and which, in response to execution of the at least one of processor executable instructions or data: performs a pre-processing evaluation of a computational problem by a processor-based device; selects at least one solver from a plurality of the solvers based at least in part on the pre-processing evaluation of the computational problem; and causes the at least one solver to generate a final result for the computational problem.

In response to execution of the at least one of processor executable instructions or data, the at least one processor: may receive the computational problem. In response to execution of the at least one of processor executable instructions or data, the at least one processor: may receive a result to the computational problem from the at least one solver; and may return the result. In response to execution of the at least one of processor executable instructions or data, the at least one processor: may generate a plurality of instances of the computational problem. The system may further include: a plurality of analog computers, wherein the at least one solver may include the plurality of analog computers. In response to execution of the at least one of processor executable instructions or data, the at least one processor: may cause a first analog computer in plurality of analog computers to implement quantum annealing to solve a first instance in the plurality of instances of the computational problem. In response to execution of the at least one of processor executable instructions or data, the at least one processor: may cause a second analog computer in plurality of analog computers to implement thermal annealing to solve a second instance in the plurality of instances of the computational problem. In response to execution of the at least one of processor executable instructions or data, the at least one processor: may cause a third analog computer in plurality of analog computers to implement a hybrid of quantum annealing and thermal annealing to solve a third instance in the plurality of instances of the computational problem. In response to execution of the at least one of processor executable instructions or data, the at least one processor: may cause a plurality of solvers in the at least one solver to generate a plurality of final results based the plurality of instances of the computational problem; may compare a first final result in plurality of final results and a second final result in the plurality of final results; and may determine a best solution based at least in part on the comparison. In response to execution of the at least one of processor executable instructions or data, the at least one processor: may return the best solution.

A method for computing using a quantum system including a plurality of qubits and a plurality of couplers, wherein each coupler provides controllable communicative coupling between two of the plurality of qubits may be summarized as including: initializing the quantum system to an initial state; decreasing a temperature of the quantum system until in a state preferred by a problem Hamiltonian; decreasing a set of quantum fluctuations for the quantum system until in the state preferred by a problem Hamiltonian; and reading out a final state of the quantum system.

The method may further include: increasing the temperature of the quantum system. The method may further include: increasing the set of quantum fluctuations of the quantum system. Decreasing the temperature of the quantum system may include reducing a physical temperature of the quantum system. Decreasing the temperature of the quantum system may include increasing a measure of the magnitude of the problem Hamiltonian relative to a physical temperature of the quantum system. Decreasing the set of quantum fluctuations of the quantum system may include decreasing a tunneling rate for a qubit in the plurality of qubits. Decreasing the set of quantum fluctuations of the quantum system may include increasing a measure of the magnitude of the problem Hamiltonian relative to an aggregated measure of tunneling rates for the plurality of qubits.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

DETAILED DESCRIPTION

Figure 1:
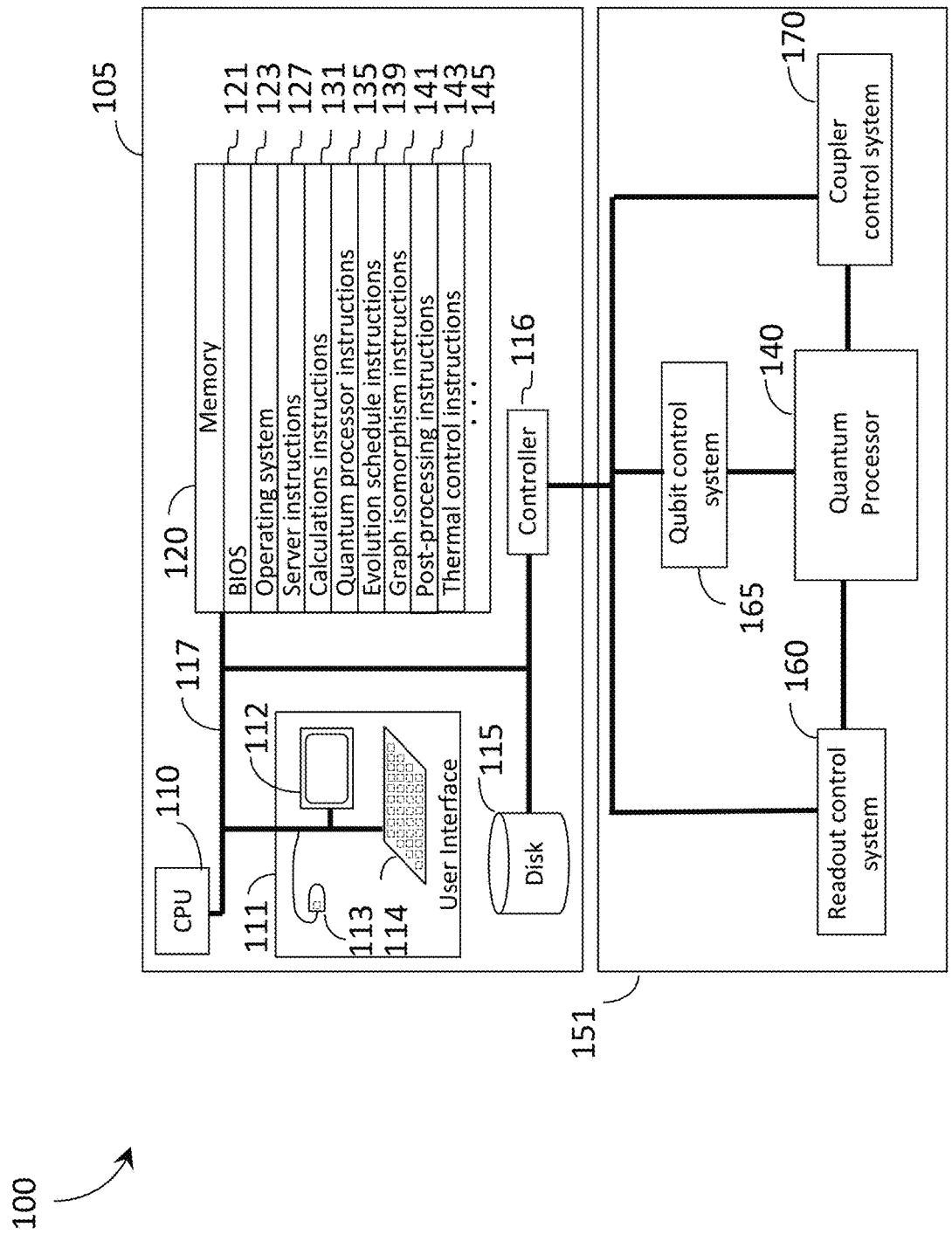
FIG. 1 is a schematic diagram that illustrates an exemplary hybrid computer including a digital processor and an analog processor in accordance with the present methods, systems and devices.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide techniques to advance quantum computing systems previously associated with quantum annealing and/or adiabatic quantum computing. Techniques described herein are used in operation of an analog computer with a new evolution schedule. In some embodiments, parameters that define the problem Hamiltonian are time-dependent. In some embodiments, annealing parameters are non-monotonically varied. Techniques described herein are used to operate an analog computer and a digital computer to solve a graph isomorphism problem. Some techniques described herein use an analog computer and a digital computer as a quantum annealer to post-processing solutions by performing non-monotonic evolution to improve the solutions. Some techniques described herein use an analog computer and a digital computer to draw samples from a function.

FIG. 1 illustrates a hybrid computing system 100 including a digital computer 105 coupled to an analog computer 151. In some implementations, the analog computer 151 is a quantum computer and the digital computer 105 is a classical computer. The exemplary digital computer 105 includes a digital processor that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 105 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer- or processor-readable instructions (sometimes known as program modules), application programs and/or data, may be located in both local and remote memory storage devices.

Digital computer 105 may include at least one digital processor (such as, central processor unit 110), at least one system memory 120, and at least one system bus 117 that couples various system components, including system memory 120 to central processor unit 110.

The digital processor may be any logic processing unit, such as one or more central processing units ("CPUs"), graphics processing units ("GPUs"), digital signal processors ("DSPs"), application-specific integrated circuits ("ASICs"), field-programmable gate arrays ("FPGAs"), etc. Unless described otherwise, the construction and operation of the various blocks shown in FIG. 1 are of conventional design. As a result, such blocks need not be described in further detail herein, as they will be understood by those skilled in the relevant art.

Digital computer 105 may include a user input/output subsystem 111. In some implementations, the user input/output subsystem includes one or more user input/output components such as a display 112, mouse 113, and/or keyboard 114. System bus 117 can employ any known bus structures or architectures, including a memory bus with a memory controller, a peripheral bus, and a local bus. System memory 120 may include non-volatile memory, such as read-only memory ("ROM"), static random access memory ("SRAM"), Flash NAND; and volatile memory such as random access memory ("RAM") (not shown). An basic input/output system ("BIOS") 121, which can form part of the ROM, contains basic routines that help transfer information between elements within digital computer 105, such as during startup.

Digital computer 105 may also include other non-volatile memory 115. Non-volatile memory 115 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 115 may communicate with digital processor via system bus 117 and may include appropriate interfaces or controllers 116 coupled to system bus 117. Non-volatile memory 115 may serve as long-term storage for computer- or processor-readable instructions, data structures, or other data (also called program modules) for digital computer 105.

Although digital computer 105 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In Line Memory Modules.

Various sets of computer- or processor-readable instructions (also called program modules), application programs and/or data can be stored in system memory 120. For example, system memory 120 may store an operating system 123, and a set of computer-or processor-readable server instructions (i.e., server modules) 127. In some implementations, server module 127 includes instruction for communicating with remote clients and scheduling use of resources including resources on the digital computer 105 and analog computer 151. For example, a Web server application and/or Web client or browser application for permitting digital computer 105 to exchange data with sources via the Internet, corporate Intranets, or other networks, as well as with other server applications executing on server computers.

In some implantations, system memory 120 may store a set of computer- or processor-readable calculation instructions (i.e., calculation module 131) to perform pre-processing, co-processing, and post-processing to analog computer 151. In accordance with the present systems and methods, system memory 120 may store at set of analog computer interface modules 135 operable to interact with the analog computer 151.

In some implementations, system memory 120 may store evolution schedule instructions or module 139 to provide new evolution schedules and/or time-dependent problem Hamiltonians in the operation in the analog computer 151. For example, the evolution schedule instructions or module 139 can implement the methods like those described in FIGS. 3, 6, 8, 9, 11, and 12 on digital computer 105 and analog computer 151. In some embodiments, system memory 120 may store graph isomorphism instructions or module 141 to check for isomorphism between two graphs. Execution of the graph isomorphism instructions or module 141 will cause a processor to determine if two or more graphs are isomorphic. In some embodiments, system memory 120 may store post-processing instructions or module 143. Execution of the post-processing instructions or module 143 will cause a processor to perform post-processing using non-monotonic evolution. Execution of the post-processing instructions or module 143 can cause performance of non-monotonic quantum annealing on a solution taken from a quantum annealing process or a classical computing process.

In some implementations, system memory 120 may store evolution schedule instructions to implement new evolution schedules. For example, the evolution schedule instructions or module 139 can implement the methods like those described in FIGS. 3, 6, 8, 9, 11, and 12 on digital computer 105 and analog computer 151. Example evolution schedules include non-monotonic quantum annealing, hybrid quantum-thermal annealing, and the like.

While shown in FIG. 1 as being stored in system memory 120, the modules shown and other data can also be stored elsewhere including in non-volatile memory 115.

The analog computer 151 is provided in an isolated environment (not shown). For example, where the analog computer 151 is a quantum computer, the environment shields the internal elements of the quantum computer from heat, magnetic field, and the like. The analog computer 151 includes an analog processor 140. Examples of an analog processor include quantum processors such as those shown in FIG. 2.

A quantum processor includes programmable elements such as qubits, couplers, and other devices. The qubits are readout via readout out system 160. These results are fed to the various sets of computer or processor readable instructions for the digital computer 105 including server modules 127, calculation module 131, analog computer interface modules 135, or other modules stored in non-volatile memory 115, returned over a network or the like. The qubits are controlled via qubit control system 165. The couplers are controlled via coupler control system 170. In some embodiments of the qubit control system 165 and the coupler control system 170 are used to implement quantum annealing as described herein on analog processor 140.

In some implementations, the digital computer 105 can operate in a networking environment using logical connections to at least one client computer system. In some implementations, the digital computer 105 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 105 may be connected to the LAN through an adapter or network interface card ("NIC") (communicatively linked to system bus 117). When used in a WAN networking environment, digital computer 105 may include an interface and modem (not shown), or a device such as NIC, for establishing communications over the WAN. Non-networked communications may additionally, or alternatively be employed.

In accordance with some embodiments of the present systems and devices, a quantum processor may be designed to perform quantum annealing and/or adiabatic quantum computation. An evolution Hamiltonian is proportional to the sum of a first term proportional to the problem Hamiltonian and a second term proportional to the delocalization Hamiltonian. A typical evolution may be represented by Equation (2):

$$H_E \propto A(t)H_D + B(t)H_P \qquad (2)$$

where $H_P$ is the problem Hamiltonian, delocalization Hamiltonian is $H_D$, $H_E$ is the evolution or instantaneous Hamiltonian, and A(t) and B(t) are examples of an evolution coefficient which controls the rate of evolution. In general, evolution coefficients vary from 0 to 1. In some implementations, a time varying envelope function is placed on the problem Hamiltonian. A common delocalization Hamiltonian is shown in Equation (3):

$$H_D \propto -\frac{1}{2}\sum_{i=1}^{N} \Delta_i \sigma_i^x \qquad (3)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2}\left[\sum_{i=1}^{N} h_i \sigma_i^z + \sum_{j>i}^{N} J_{ij} \sigma_i^z \sigma_j^z\right] \qquad (4)$$

where N represents the number of qubits, $\sigma_i^z$ is the Pauli z-matrix for the $i^{th}$ qubit, $h_i$ and $J_{i,j}$ are dimensionless local fields for the qubits, and couplings between qubits, and $\varepsilon$ is some characteristic energy scale for $H_P$. Here, the $\sigma_i^z$ and $\sigma_i^z \sigma_j^z$ terms are examples of "diagonal" terms. The former is a single qubit term and the latter a two qubit term. Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in Equations (3) and (4), respectively, may be physically realized in a variety of different ways. A particular example is realized by an implementation of superconducting qubits.

Figure 2:
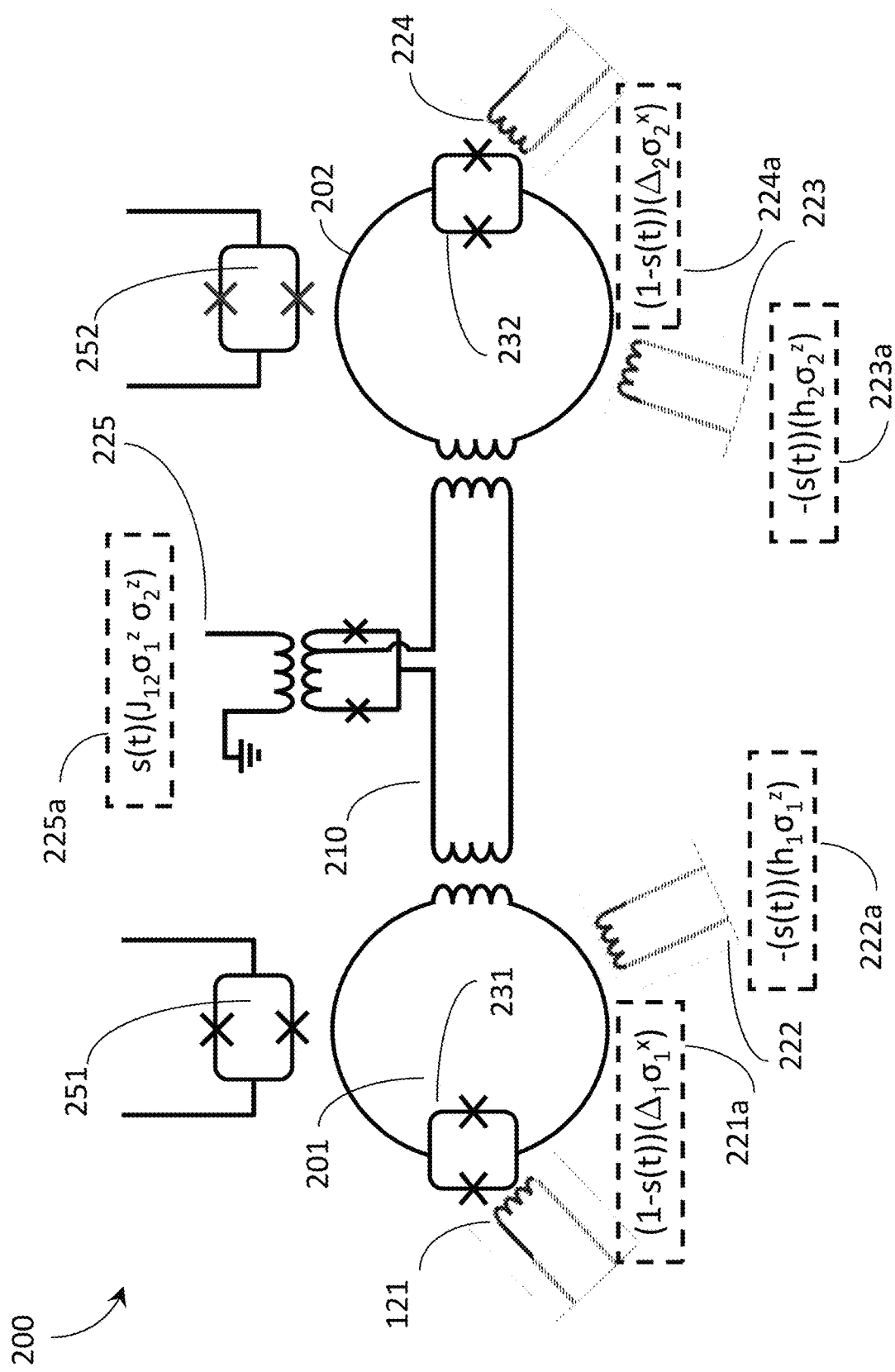
FIG. 2 is a schematic diagram that illustrates a portion of an exemplary superconducting quantum processor designed for quantum annealing and/or adiabatic quantum computing in accordance with the present methods, systems and devices.

FIG. 2 is a schematic diagram of a portion of an exemplary superconducting quantum processor 200 designed for quantum annealing (and/or adiabatic quantum computing) components from which may be used to implement the present systems and devices. The portion of superconducting quantum processor 200 shown in FIG. 2 includes two superconducting qubits 201, and 202. Also shown is a tunable $\sigma_i^z \sigma_j^z$ coupling (diagonal coupling) via coupler 210 therebetween qubits 201 and 202 (i.e., providing 2-local interaction). While the portion of quantum processor 200 shown in FIG. 2 includes only two qubits 201, 202 and one coupler 210, those of skill in the art will appreciate that quantum processor 200 may include any number of qubits and any number of couplers coupling information therebetween.

The portion of quantum processor 200 shown in FIG. 2 may be implemented to physically realize quantum annealing and/or adiabatic quantum computing. Quantum processor 200 includes a plurality of interfaces 221-225 that are used to configure and control the state of quantum processor 200. Each of interfaces 221-225 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. Nos. 7,876,248 and 8,035,540.

In the operation of quantum processor 200, interfaces 221 and 224 may each be used to couple a flux signal into a respective compound Josephson junction 231 and 232 of qubits 201 and 202, thereby realizing the $\Delta_i$ terms in the system Hamiltonian. This coupling provides the off-diagonal $\sigma^x$ terms of the Hamiltonian described by Equation (3) and these flux signals are examples of "delocalization signals". Similarly, interfaces 222 and 223 may each be used to apply a flux signal into a respective qubit loop of qubits 201 and 202, thereby realizing the $h_i$ terms in the system Hamiltonian. This coupling provides the diagonal $\sigma^z$ terms of Equation (4). Furthermore, interface 225 may be used to couple a flux signal into coupler 210, thereby realizing the $J_{i,j}$ term(s) in the system Hamiltonian. This coupling provides the diagonal ($\sigma_i^z \sigma_j^z$) terms of Equation (4). In FIG. 2, the contribution of each of interfaces 221-225 to the system Hamiltonian is indicated in boxes 221a-225a, respectively. As shown, in the example of FIG. 2, the boxes 221a-225a are elements of time varying Hamiltonian for quantum annealing and/or adiabatic quantum computing.

Throughout this specification and the appended claims, the term "quantum processor" is used to generally describe a collection of physical qubits (e.g., qubits 201 and 202) and couplers (e.g., coupler 210). The physical qubits 201 and 202 and the coupler 210 are referred to as the "programmable elements" of the quantum processor 200 and their corresponding parameters (e.g., the qubit $h_i$ values and the coupler $J_{i,j}$ values) are referred to as the "programmable parameters" of the quantum processor. In the context of a quantum processor, the term "programming subsystem" is used to generally describe the interfaces (e.g., "programming interfaces" 222, 223, and 225) used to apply the programmable parameters (e.g., the $h_i$ and $J_{i,j}$ terms) to the programmable elements of the quantum processor 200 and other associated control circuitry and/or instructions.

As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 221 and 224) used to evolve the programmable elements of the quantum processor 200 and other associated control circuitry and/or instructions. For example, the evolution subsystem may include annealing signal lines and their corresponding interfaces (221, 224) to the qubits (201, 202).

Quantum processor 200 also includes readout devices 251 and 252, where readout device 251 is associated with qubit 201 and readout device 252 is associated with qubit 202. In some embodiments, such as shown in FIG. 2, each of readout devices 251 and 252 includes a DC-SQUID inductively coupled to the corresponding qubit. In the context of quantum processor 200, the term "readout subsystem" is used to generally describe the readout devices 251, 252 used to read out the final states of the qubits (e.g., qubits 201 and 202) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 2 illustrates only two physical qubits 201, 202, one coupler 210, and two readout devices 251, 252, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a superconducting flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997, *IEEE Trans. on Appl. Supercond.* 7, 3638; Friedman, et al., 2000, *Nature* 406, 43; and Harris, et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some embodiments, the qubits and couplers are controlled by on chip circuitry. Examples of on-chip control circuitry can be found in U.S. Pat. Nos. 7,876,248; 7,843,209; 8,018,244; 8,098,179; 8,169,231; and 8,786,476. Further details and implementations of exemplary quantum processors that may be used in conjunction with the present systems and devices are described in, for example, U.S. Pat. Nos. 7,533,068; 8,008,942; 8,195,596; 8,190,548; and 8,421,053.

I) Time-Dependent Coefficients of the Problem Hamilton

Techniques described herein are used to operate a quantum computer with a new evolution schedule. All previous evolution schedules known to applicants include time-independent values of the coefficients of the problem Hamilton. However, the problem Hamiltonian does have a monotonically increasing envelope. See, for example, Johnson, et al., 2011 *Nature* 473, 194, where different monotonically increasing envelopes were used to show a clear signature of quantum annealing. The envelopes have a ramp transition that begins at different times during different anneals. The quantum nature of the system is shown in terms of this time dependence. Here in, the new evolution schedule, the coefficients of the problem Hamilton are time-dependent.

In addition to a time-dependent envelope function, a problem Hamiltonian may have one or more time-dependent coefficients. A common problem Hamiltonian includes first component proportional to diagonal single qubit terms and a second component proportional to diagonal multi-qubit terms. In some implementations, the value of the single qubit terms may change over time relative to the value of the multi-qubit terms. Thus the problem Hamiltonian, for example, may be of the form:

$$H_P \propto -\frac{\varepsilon}{2}\left[\sum_{i=1}^{N} h_i(t)\sigma_i^z + \sum_{j>i}^{N} J_{ij}\sigma_i^z\sigma_j^z\right] \quad (5)$$

Note the time varying coefficients for the single qubit terms. In some implementations, the time dependence is the same for all single qubit terms. In some implementations, the value of the multi-qubit terms may change over time relative to the value of the single-qubit terms. Thus the problem Hamiltonian, for example, may be of the form:

$$H_P \propto -\frac{\varepsilon}{2}\left[\sum_{i=1}^{N} h_i\sigma_i^z + \sum_{j>i}^{N} J_{ij}(t)\sigma_i^z\sigma_j^z\right] \quad (6)$$

Note the time varying coefficients for the multi-qubit terms. In some implementations, the time dependence is the same for all multi-qubit terms. In some implementations, both the multi-qubit terms and the single-qubit terms are time-dependent.

Example of time-dependent coefficients include values that change in the following manners: step, ramping, logistic, and the like. In some embodiments, coefficients on qubit terms can change following a step function. For example, consider single qubit terms changing as:

$$h(t) = \begin{cases} h_1 & \text{for } 0 \le t < t^* \\ h_2 & \text{for } t^* \le t \le t_f \end{cases} \quad (7)$$

Now, $h_1$ can be greater than or less than $h_2$ depending on the example. The selection of a transition time $t^*$ varies with examples of the implementation. For the case where the transition time is very early in the evolution, $t^* \approx 0$, the system has enough time to relax after the change. Thus the system can "forget" about $h_1$. The problem Hamiltonian is thus Equation (5) with $h(t)=h_2$, for all qubits. Conversely, where the transition time is very late in the evolution, $t^* \approx t_f$, the change in local qubit bias can happen after dynamical freeze-out of all the qubits. Thus the problem Hamiltonian is thus Equation (5) with $h(t)=h_1$. An intermediate regimen exists in which the transition time $t^*$ is somewhere in the middle of the evolution i.e., neither very early in the evolution nor very late in the evolution. In some implementations, by repeatedly changing the value of the transition time in repeated evolutions, one builds up statistics on the problem Hamiltonian.

As the transition time is moved from the beginning to end of the evolution, the slow relaxation channels freeze earlier and therefore cause the system to relax to some intermediate states (e.g., local minima) instead of the ground states of the new Hamiltonian. As the transition time gets closer to the end of the evolution, more channels freeze and therefore states with higher energy will be observed. In cases where the transition time is nearly at the end of the evolution, $t^* \approx t_f$, the observed states will be further away from the ground states of Hamiltonian with $h=h_2$, but closer to ground states with $h=h_1$.

Figure 3:
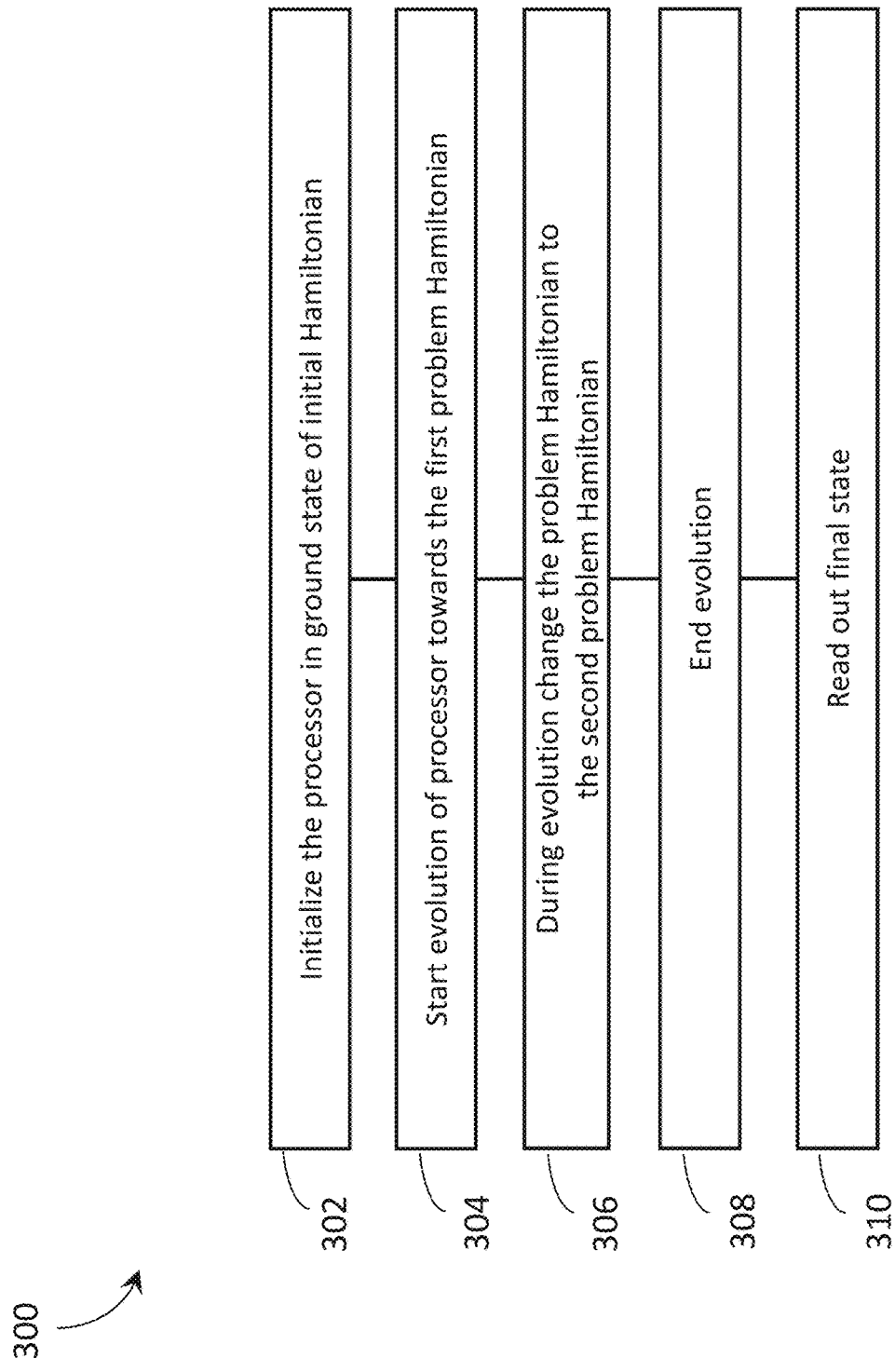
FIG. 3 is a flow diagram showing a method of operating a quantum processor using time-dependent coefficients in accordance with the present systems, devices, articles, and methods.

FIG. 3 illustrates a method 300 of operating a quantum processor using time-dependent coefficients in accordance with the present methods, systems and devices. For the method 300, as with others methods taught herein, the various acts may be performed in a different order than that illustrated and described. Additionally, the methods can omit some acts, and/or employ additional acts. One or more of these acts may be performed by or via one or more circuits, e.g., a processor. Method 300 can be implemented by a processor following a series of processor readable instructions stored on a media. In some embodiments, method 300 is performed by a specialized device such as an adiabatic quantum computer, or a quantum annealer, or a hybrid computer including a digital computer and an analog computer. Method 300 will be described in relation to hybrid computer as an example.

At 302, the hybrid computer initializes a quantum processor in a ground state of an initial Hamiltonian. The initial Hamiltonian is selected because its ground state is accessible. The initial Hamiltonian is the instant Hamiltonian of the quantum processor. At 304, the hybrid computer evolves the quantum processor, as described by the instant Hamiltonian toward the first problem Hamiltonian, $H_P$. The first problem Hamiltonian, $H_P$, is characterized by the initial value of time-dependent coefficient. For example, if the single qubit terms are time-dependent then the first problem Hamiltonian includes as coefficients $h_1$. At 306, while the evolution is occurring, the hybrid computer replaces the first problem Hamiltonian with a second problem Hamiltonian, $H'_P$. That is, at transition time, $t^*$, a change begins. The hybrid computer changes the problem Hamiltonian with effect on the instant Hamiltonian. For example, if the single qubit terms are time-dependent then the first problem Hamiltonian includes as coefficients $h_2$. In general, the instantaneous Hamiltonian can be modelled as:

$$H_E \propto A(t)H_D + B(t)H_P(t) \quad (8)$$

Note the time dependence on the problem Hamiltonian. At 308, the evolution is completed. At 310, the hybrid computer reads out the final state of the state of the system.

In some implementations, the transition time $t^*$ is varied over an iterative loop. For example, a for-loop wraps around method 300 in which the transition time is slowly increased from at or near the initiation of the evolution to a value at or near the end of the evolution. In another example, the variation of transition time can be slowly decreased. The data collected over these iterations can be returned for further processing, display, or the like. For example, the hybrid computer may create a plot showing the expectation value of the states of qubits versus transition time. Alternatively, the expectation value of the states of qubits can be described as the magnetization of the qubits. Another example of data for display or further processing is the expectation value of the second problem Hamiltonian, $H'_P$, versus transition time.

II) Non-Monotonic Evolution

Techniques described herein are used to operate a quantum computer with a new evolution schedule. All previous evolution schedules known to applicant have been monotonic in that the evolution coefficient only increases, or only decreases, with time. As well, all previous evolution schedules include a monotonically increasing envelope function on the problem Hamiltonian. In the new evolution schedule, the evolution coefficient is non-monotonic; it may increase and decrease in an evolution. In the new evolution schedule, the envelope function on the problem Hamiltonian is non-monotonic.

The new evolution schedule, in which the evolution coefficient is non-monotonically varied, may be used to solve computational difficult problems. For example, this technique may be used to perform quantum post-processing to improve a solution resulting from processing. Another example includes using this new evolution schedule to check for graph isomorphism. In general, the new evolution schedule, in which the evolution coefficient is non-monotonically varied, is used to extract information from the middle the new evolution schedule.

The process of changing the Hamiltonian in adiabatic quantum computing and/or quantum annealing may be referred to as evolution. The process of evolution is effected by adjusting one or more parameters in the quantum processor. Collectively, these are the evolution coefficient. An example of an evolution coefficient is adjusting the transverse field to the qubit. Another example is varying the flux applied to a compound Josephson junction.

Figure 4:
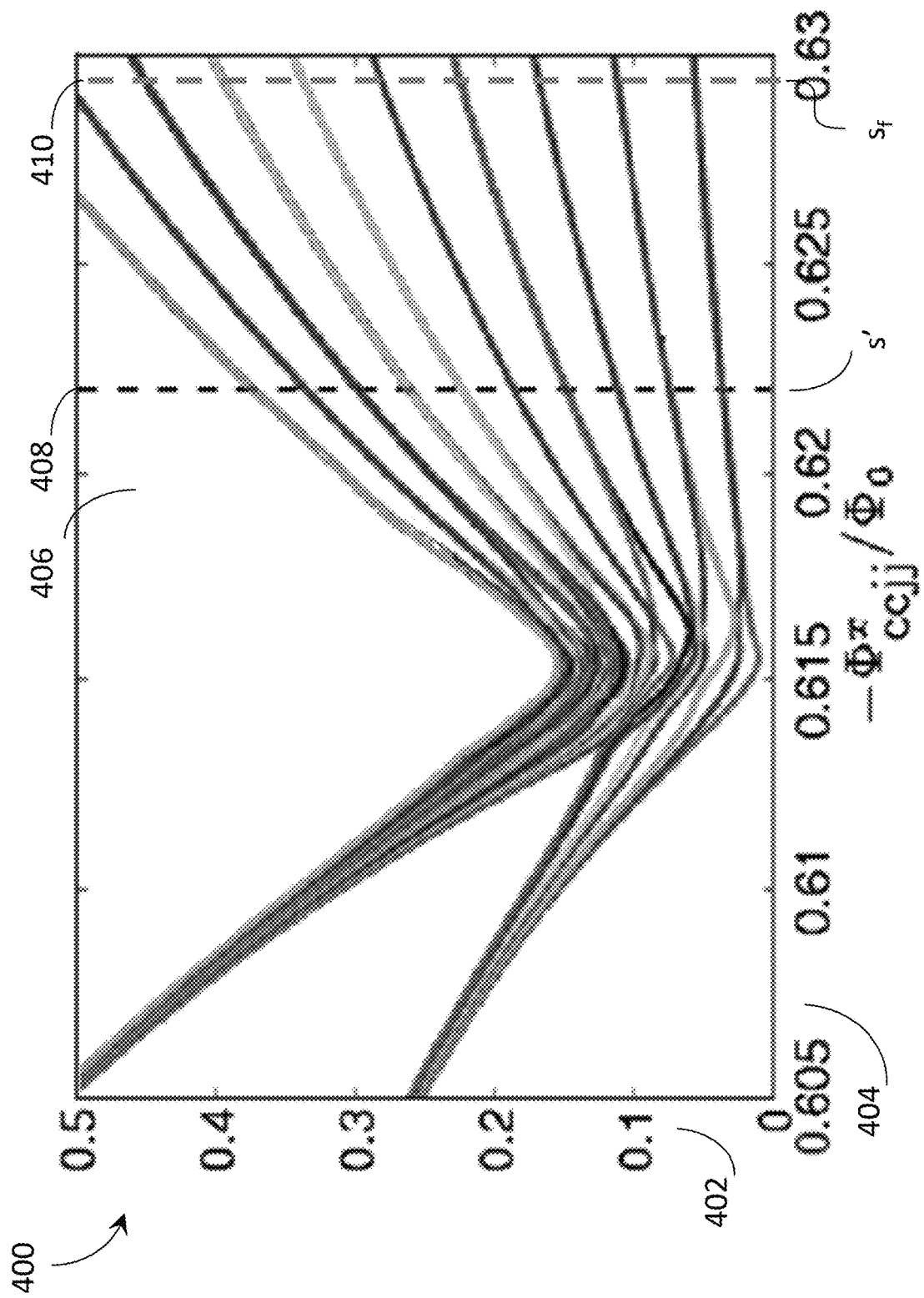
FIG. 4 is a graph of an evolution of energy spectra for a quantum processor in accordance with the present systems, devices, articles, and methods.

FIG. 4 shows a graph 400 of an evolution of energy spectra for a quantum processor in accordance with the present methods, systems and devices. Included in graph 400 is a vertical axis 402 and horizontal axis 404. Vertical axis 402 represents energy level and horizontal axis 404 represents evolution coefficient. An example of a scale for the vertical axis is temperature or energy minus ground state energy normalized by the Boltzmann constant. Included in graph 400 is a series of energy levels 406 for the instant Hamiltonian plotted against an evolution coefficient. As shown, sixteen energy levels are plotted against the parameter applied flux, the evolution coefficient, s. The levels change value during the evolution as the evolution coefficient moves monotonically with time. That is, the evolution coefficient never decreases. Here the evolution coefficient is the flux applied compound Josephson junction.

The instant state of the quantum processor, denoted s', is shown as vertical line 408 and the final state, $s_f$, is shown as vertical line 410. The progression of line 408 from axis 402 to line 410 represents the evolution and is an increase in the evolution coefficient. The evolution can be adiabatic or quantum annealing. Further details on adiabatic quantum computing and/or quantum annealing systems, methods, and apparatus are described in, for example, U.S. Pat. Nos. 7,135,701; and 7,418,283.

Figure 5:
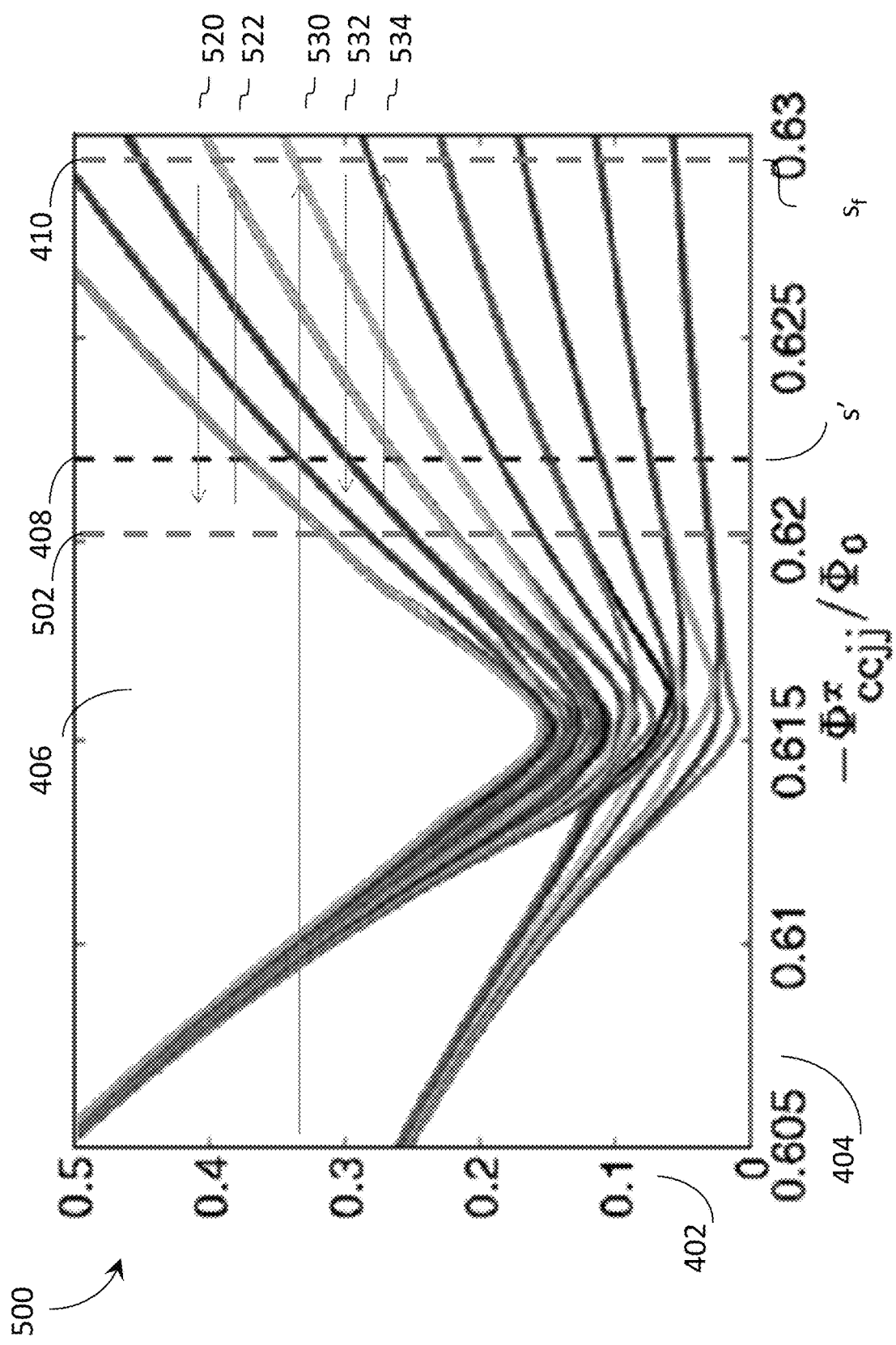
FIG. 5 is a graph of an evolution of energy spectra with bi-directional evolution for a quantum processor in accordance with the present systems, devices, articles, and methods.

Techniques described herein are used to operate a quantum computer with a new evolution schedule where the evolution coefficient may increase and decrease. FIG. 5 shows a graph of an energy spectrum of a quantum processor versus an evolution coefficient in accordance with the present methods, systems and devices. Included in graph 500 is a vertical axis 402 and horizontal axis 404. As described previously, vertical axis 402 represents energy and horizontal axis 404 represents an evolution coefficient. Energy levels 406 for an instant Hamiltonian plotted against an evolution coefficient. The instant state of the system, is shown as vertical line 408. The evolution starts at the final state, $s_f$, is shown as vertical line 410.

The evolution proceeds to a turning point, s*, denoted by vertical line 502. In the example illustrated in FIG. 5, a backwards evolution indicated by arrow 520 from the final state to the turning point, s*, is a decrease in the evolution coefficient. A forward evolution indicated by arrow 522 from the turning point to the final state is an increase in the evolution coefficient. The backward evolution 520 precedes the forward evolution 522.

In some implementations, evolution starts at the final state, $s_f$, proceeds in a first direction to a turning point, $s^*$. Then the evolution proceeds in a second direction toward the final state, $s_f$; the first and second direction being opposite directions. In some implementations, the quantum processor evolves in the first direction again to another turning point. The other turning point can be the same or different from the turning point. The quantum processor then evolves from the other turning point to the final state, $s_f$.

In some implementations, evolution starts at an initial, $s_0$, proceeds in a first direction, indicated by arrow 530, to final state, $s_f$. Then the evolution proceeds in a second direction, indicated by arrow 532, toward a turning point, $s^*$. Again, the first and second directions are opposite. The quantum processor evolves in the first direction, indicated by arrow 534, toward the final state, $s_f$. In some implementations, the quantum processor further evolves in first and second direction.

Figure 6:
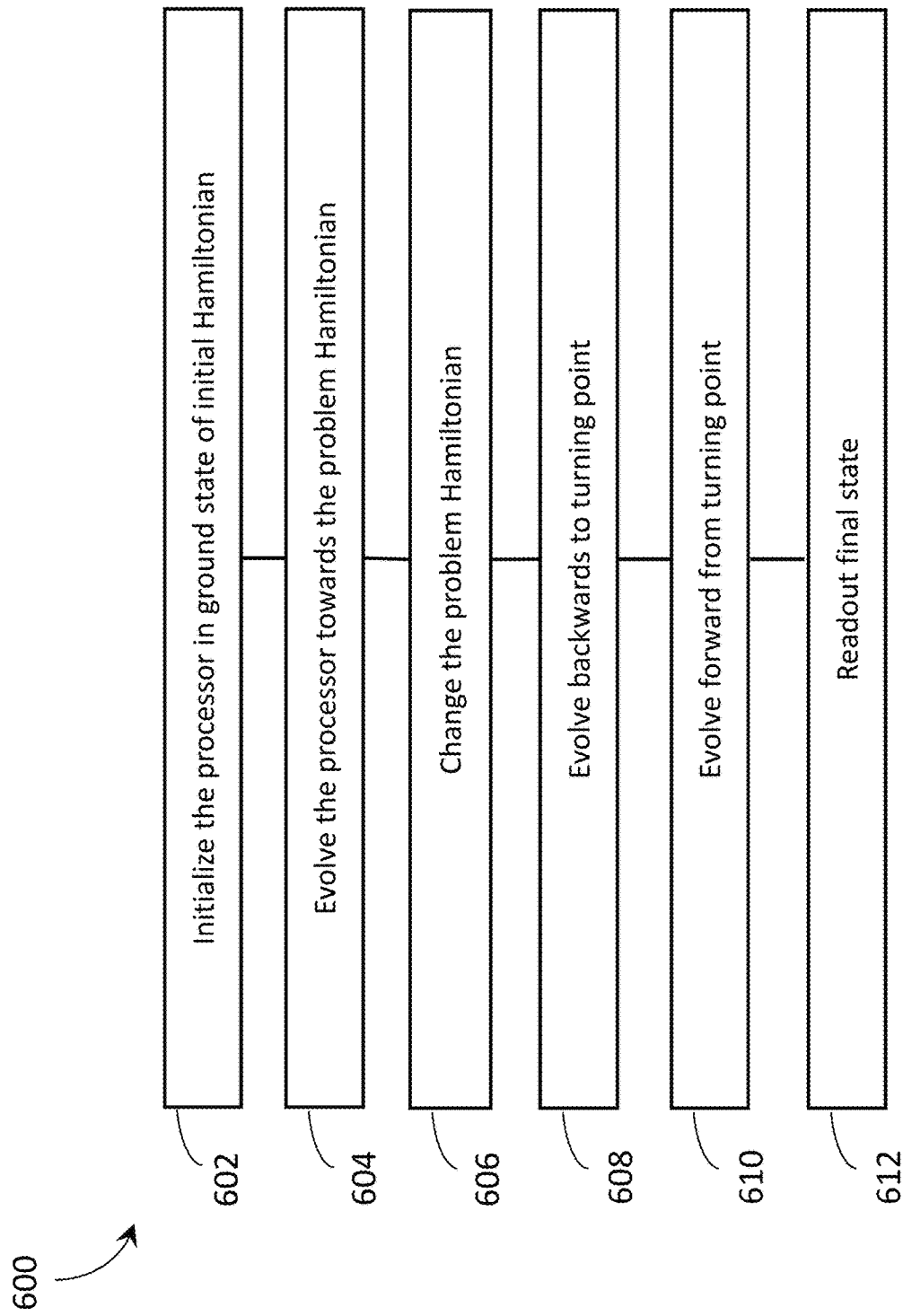
FIG. 6 is a flow diagram showing a method of operating a quantum processor with bi-directional evolution in accordance with the present systems, devices, articles, and methods.

FIG. 6 shows a method 600 of operating a quantum processor with bi-directional evolution in accordance with the present methods, systems and devices. The method 600 describes the acts associated with the evolution described in FIG. 5. Method 600 could be implemented by a processor following a series of processor readable instructions stored on a media. In some embodiments, method 600 is performed by a specialized device such as an adiabatic quantum computer or a quantum annealer, or a hybrid computer including a digital computer and an analog computer. Method 600 will be described in relation to hybrid computer as an example.

At 602, the hybrid computer initializes a quantum processor in a ground state of an initial Hamiltonian. The initial Hamiltonian is selected because its ground state is accessible. At 604, the hybrid computer evolves the quantum processor as described by the instant Hamiltonian toward the final Hamiltonian. In some implementations, the evolution is linear. In some embodiments, the evolution is non-linear. In some implementations, the final Hamiltonian does not commute with the initial Hamiltonian. In some implementations, the final Hamiltonian does commute with the initial Hamiltonian.

At 606, the hybrid computer updates the problem Hamiltonian. That is, the problem Hamiltonian is, in effect, labeled the first problem Hamiltonian and replaced with a second problem Hamiltonian. An exemplary first problem Hamiltonian is one that provides a final state with high fidelity. For example, all qubits locally biased on the same direction and no couplings between qubits provided. Further examples of first problem Hamiltonians and second problem Hamiltonians are provided below.

At 608, the hybrid computer causes a backwards evolution in the quantum processor. The system is evolved in the reverse direction to the evolution in operation 604. The backwards evolution begins at the final state, $s_f$, and continues to a turning point, $s^*$. At the turning point the hybrid computer causes the processor to evolve according to a second forward evolution, operation 610. The specialized device evolves the state from the turning point, $s^*$, to the final state, $s_f$.

At 612 the hybrid computer reads out the state of the quantum processor. The final state of the system is recorded. In some implementations, the hybrid computer collects and records a series of final states along with the associated turning points, $s^*$. The final state may or may not depend on the turning point, $s^*$. The final state can be plotted against the turning point or a value derived from the turning point. In some implementations, the final state is diagonal in the qubit basis allowing the final state to be determined, at zero temperature, in one readout operation. At non-zero temperature, more than one read-out may be required. When the final state is in a different basis, information is extracted from read out by doing many readout operations.

In some implementations, a series of final states is recorded with the associated evolution scheduling including annealing rate, turning point, and the like. In some implementations, the reverse and second forward annealing are linear in that first derivative is non-zero and higher order derivatives are at or near zero during the anneal. In some implementations, the reverse and second forward annealing are non-linear having non-zero first and higher order derivatives. The final state may be plotted against an associated turning point, average annealing rate, evolution schedule, or the like.

Method 600 may by summarized as a computational method including initializing of an analog processor to a first initial state and causing the analog processor to evolve from the initial state, under a non-monotonic evolution schedule, toward a final state determined by a problem Hamiltonian associated with first computational problem. The method further including reading out the first final state thereby determining a first result of the first computational problem. Method 600, as summarized, may be implemented by a system from processor readable instructions stored on at least one computer readable media.

III) Graph Isomorphism Determination

Figure 7:
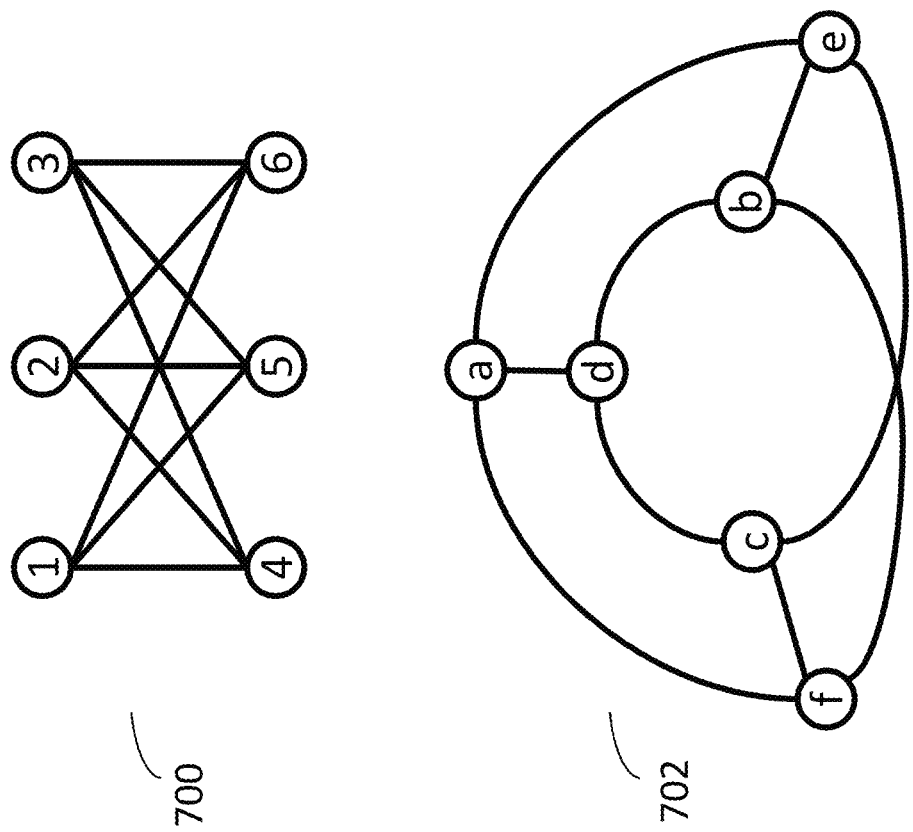
FIG. 7 is a schematic diagram of two exemplary isomorphic graphs.

FIG. 7 illustrates two isomorphic graphs 700, and 702. Graph 700 includes six vertices (labeled 1-6) and nine edges. Graph 702 includes six vertices (labeled a-f) and nine edges. The isomorphism question is: does there exist a relabeling of the nodes of one graph such that the other graph is produced. In this example the answer is yes. A relabeling looks like (1,a), (2,b), (3,c), (4,d), (5,e), and (6,f). As the graphs grow in size, the determination of an isomorphism, that is finding a relabeling, gets harder. As the graphs grow in size the determining if two graphs are not isomorphic can be useful. Areas of application include finding structural analogs to chemical compounds.

Figure 8:
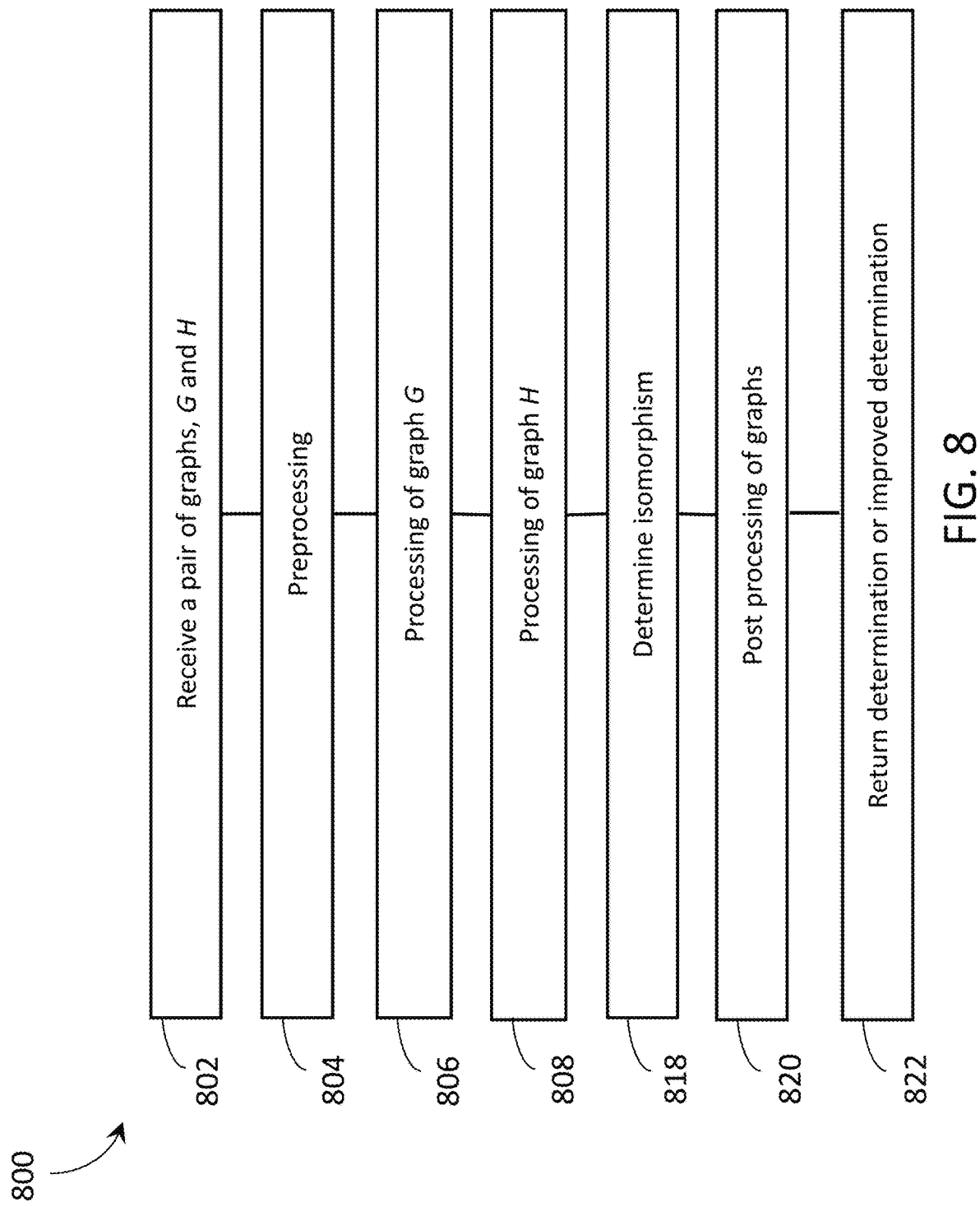
FIG. 8 is a flow diagram showing a method for determining if two graphs are isomorphic in accordance with the present systems, devices, articles, and methods.

FIG. 8 shows a method 800 for determining if two graphs are isomorphic in accordance with the present methods, systems and devices. In some implementations, method 800 is performed by a graph isomorphism checker in cooperation with another specialized device such as an adiabatic quantum computer, a quantum annealer, or a hybrid computer including a digital processor and a quantum processor.

At 802, the checker receives a pair of graphs to compare. Conventionally these graphs are called, $G_1$, and $G_2$. A graph is a set of a set of vertices and edges and is commonly denoted as G=(V, E) were V are the vertices, and E the edges. A graph $G_1$ could be denoted $G_1=(V_1, E_1)$ with similar notation for $G_2$.

At 804 preprocessing begins. Example preprocessing acts include comparing the number of vertices, that is $|V_1|$ versus $|V_2|$. If the number of vertices for the graphs are unequal the graphs can't be isomorphic. Another possible preprocessing act includes checking the number of edges, that is compare $|E_1|$ to $|E_2|$. Again the numbers must be equal for the graphs to be isomorphic. A third preprocessing act is comparing the number of edges incident on each vertex. For example, comparing a first set of numbers corresponding to edges incident on each vertex in the first graph to a second set of numbers corresponding to edges incident on each vertex in the second graph. If there is a difference between the set of number the pair are not isomorphic. A fourth preprocessing act is spectral analysis. Each graph has a characteristic matrix. For example, an adjacency matrix recording the connectivity of the vertices in the graph. If the adjacency matrices of the graphs have different spectra of eigenvalues they are not isomorphic. Another characteristic matrix is the Laplacian matrix of a graph, recording the degree of the vertices and their connectivity. Equivalently, if the Laplacian matrices of the graphs have different second smallest eigenvalues they are not isomorphic. Some implementations do not include preprocessing 804 in a method like method 800 because the preprocessing is done prior to starting the method 800.

At 806, the checker processes the first of the pair of graphs. The graphs are processed in a process similar processes described herein, for example, in FIG. 3, 5, or 6. The processing includes variety of evolution schedules including variation of rate, transition times, and turning points. In some implementations, the evolution schedule is varied. In some implementations, variation of transition time is used. In some implementations, the turning points are varied.

For example, there could be a for-loop from 1 to integer N. Each iteration the s* value is decremented away from $s_f$ by a small quantity, ε. In some implementations, in each iteration the system is prepared in an initial state, for example, using the method of 602 and 604 of FIG. 6, or method 900 of FIG. 9 (described herein).

Next, in each iteration, an evolution is made. In some implementations, the evolution is a backwards and then a forward evolution is made in accordance with, for example, acts 606-610 of the method 600 (see FIG. 6). In some implementations, the evolution is forward evolution with time dependent coefficients in the problem Hamiltonian (see description of FIG. 3). The final states are read out and used to build up information on the dependence of final state to turning point. One chart is created for each graph.

The checker creates a problem Hamiltonian for each graph. Each problem Hamiltonian is symmetric with respect to permutations of the qubit index. That is, the Hamiltonian is invariant with change of qubit index for qubits in the graph G=(V,E). For example, consider problem Hamiltonian:

$$H_P \propto h \sum_{i \in V} \sigma_i^z + J \sum_{i,j \in E} \sigma_i^z \sigma_j^z \quad (9)$$

Here the index of the qubit, for qubits in the graph, has no effect on the strength of local qubit bias or strength of coupling. Qubits not in the graph will have a different local qubit bias term such as zero.

At 808, the checker processes the other graph in the same way the first graph was processed. If bi-directional annealing was used in 806, then it is used here. If time-dependent problem Hamiltonians are used, then they are used here.

At 818, a determination is made as to whether the two graphs are isomorphic. The determination is made by comparing the graphs. If the graphs are isomorphic the graphs will be similar.

Optionally at 820, post processing begins. In some embodiments, post processing can be used to analyze the data from previous portions of method 800. For example, post processing can check or improve the quality a determination as to whether two graphs are isomorphic.

At 822, the determination, or improved determination, is returned. The returned determination can include a determination that the two graphs are not isomorphic.

Figure 9:
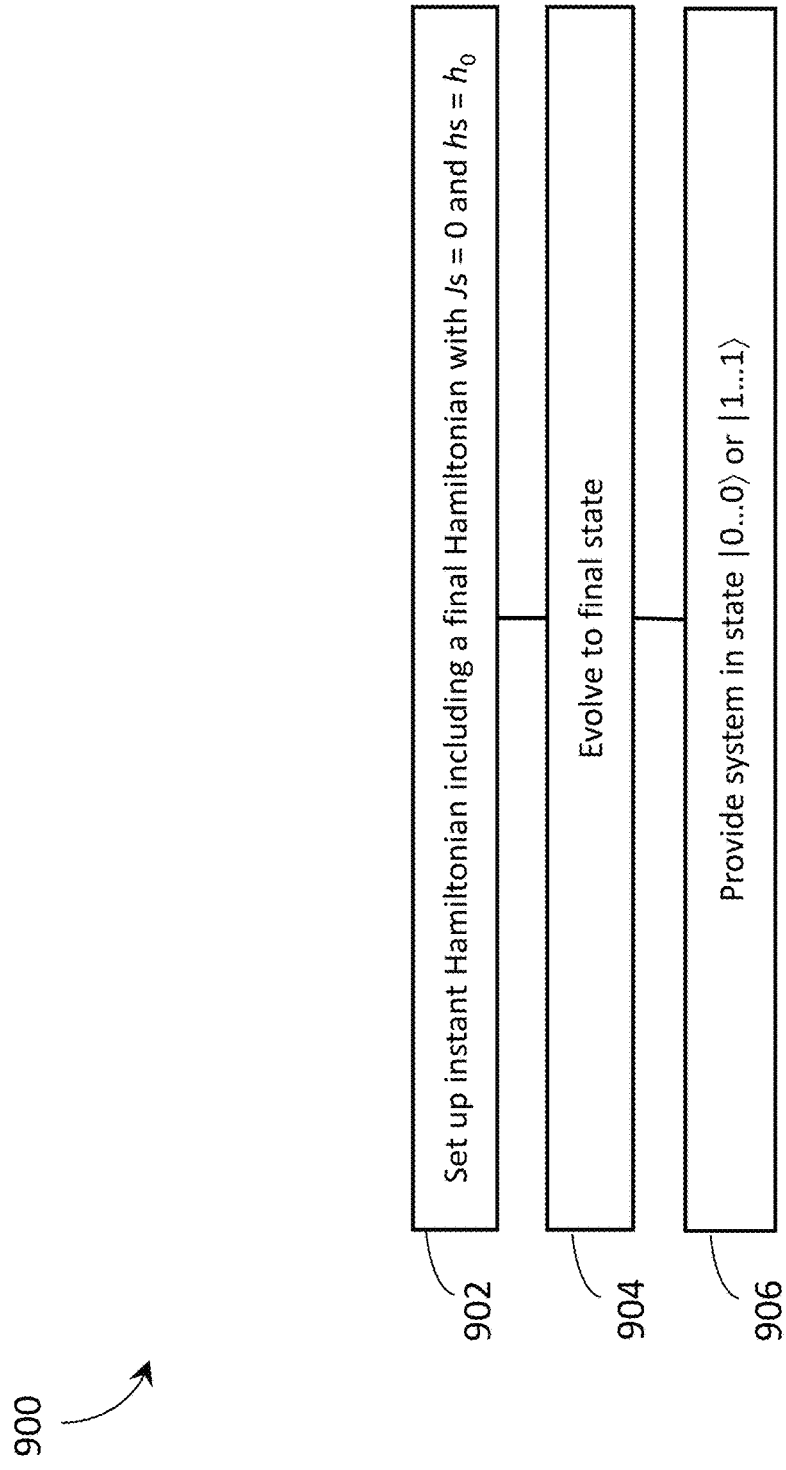
FIG. 9 is a flow diagram showing a method for initializing a quantum processor in accordance with the present systems, devices, articles, and methods.

FIG. 9 is shows a method 900 for initializing a quantum processor in accordance with the present methods, systems and devices.

At 902, a specialized device, such as an adiabatic quantum computer or a quantum annealer, sets up an instant Hamiltonian including a final Hamiltonian. The final Hamiltonian is free of qubit-qubit couplings and all the local bias terms are set to $h_0$, where the sign of $h_0$ is selected to get either all qubit in the same state—all qubits |0> or |1> in the qubit basis.

At 904, the specialized solver evolves the Hamiltonian to the final Hamiltonian state, s=1. With high fidelity the system is now in state |0 . . . 0> or |1 . . . 1> depending on the sign of $h_0$. At 906, the processor is provided in state |0 . . . 0> or |1 . . . 1>. In some implementations, method 900 is used to create a suitable initial state in method 600 replacing operations 602 and 604.

IV) Quantum Post-Processing

Figure 10:
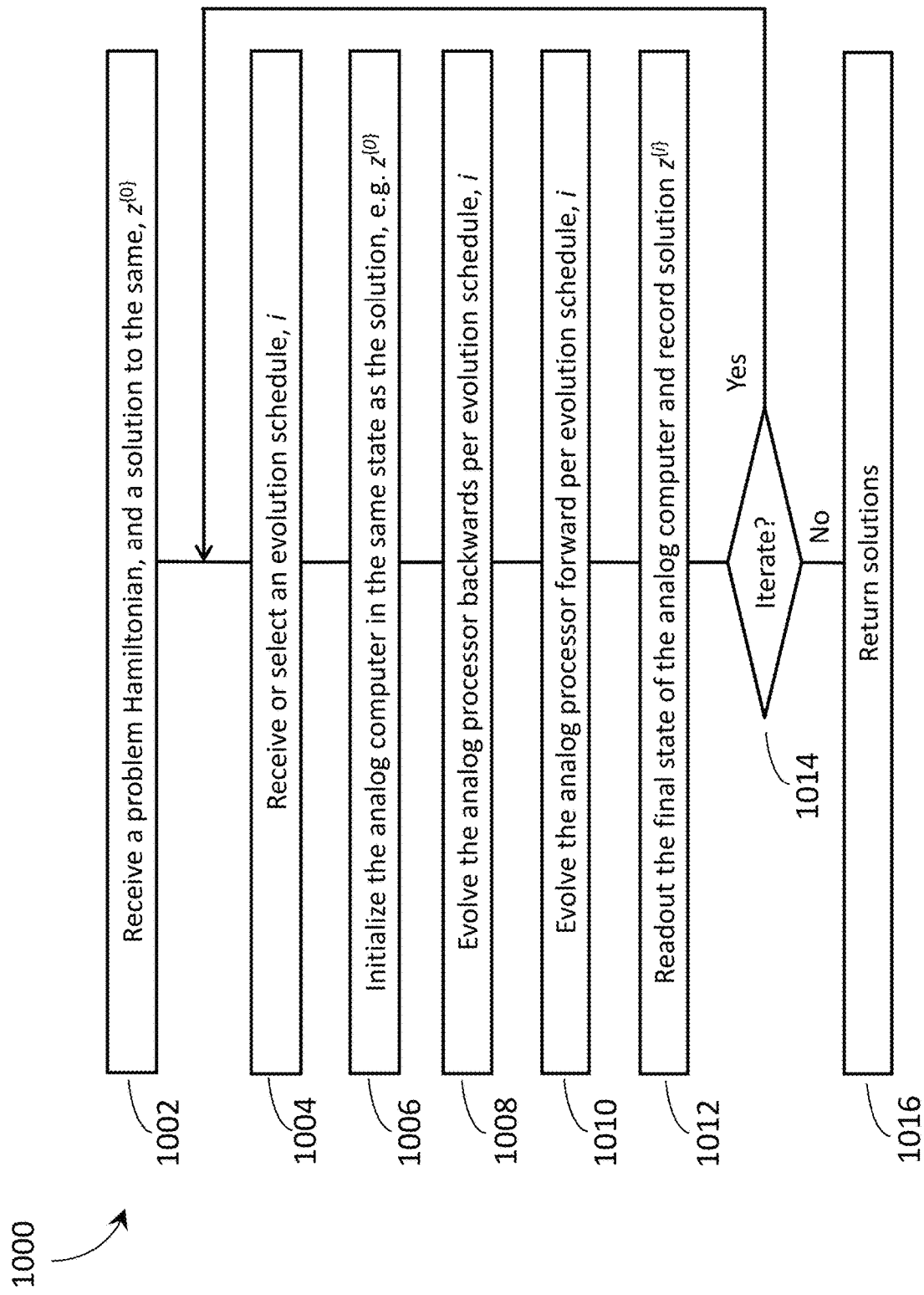
FIG. 10 is a flow diagram showing a method of preforming quantum post-processing in accordance with the present systems, devices, articles, and methods.

FIG. 10 shows a method 1000 of preforming quantum post-processing. Method 1000 could be implemented by a series of processor executable instructions stored on a computer readable media. In some implementations, method 1000 is performed by a specialized device such as an adiabatic quantum computer or a quantum annealer. In some implementations, method 1000 is performed by a specialized device to improve solution provided by a digital processor. A digital processor may be any logic processing unit, such as one or more central processing units ("CPUs"), graphics processing units ("GPUs"), digital signal processors ("DSPs"), application-specific integrated circuits ("ASICs"), field-programmable gate arrays ("FPGAs"), and the like.

At 1002, a problem Hamiltonian, $H_P$, and an initial solution, $z^{\{0\}}$, to the same are received. The specialized device is tasked to find a better solution to the problem embodied in the problem Hamiltonian. At 1004, an evolution schedule is received or selected. This evolution schedule includes non-monotonic evolution. The evolution schedule includes a turning point, rate information, and the like.

At 1006, the analog computer is initialized in a configuration corresponding to the initial solution, for instance via the application of local biases. The local bias and the couplings are set to reflect the problem Hamiltonian.

In a method similar to portions of method 600, the specialized processor evolves the state of the analog computer backwards per the selected or received evolution schedule, i. (See 1008.) At 1010, the specialized processor evolves the state of the analog computer forwards per the selected or received evolution schedule, i. At 1012, a readout is made of the state of the analog computer. The state is recorded against evolution schedule, i, and thus labeled, $z^{\{i\}}$.

At 1014, the specialized device determines whether to iterate further or not. In some implementations, the iteration is based on the improvement in solution obtained by post-processing quantum annealing. Because a Hamiltonian evaluates to an energy, the quality of a solution can be evaluated. Generally, the lower the energy of a solution the better the solution. If a better solution is found, then further iteration can be done or not. In some cases the determination of whether the iteration should continue is based at least in part on a rate of finding better solutions, that is how often a new annealing schedule leads to a better solution. In some embodiments, the elapsed processing time determines if the iteration should continue. If a determination is made at 1014 to iterate (Yes branch), controls returns to 1004 with the selection or receipt of a new evolution schedule. If a determination is made at 1014-to not iterate (No branch), the specialized device returns the solutions at 1016. The method 1000 may then terminate until called or executed again.

V) Multi-Part Annealing Schedule

Throughout this specification and the appended claims, the terms "sample", "sampling", "sampling device", and "sample generator" are used. These terms are used herein in like manner to their corresponding uses in the arts of statistics and statistical analysis, and electrical engineering.

In statistics, a sample is a subset of a population. That is, a plurality of data points collected from a statistical population. The process of sampling is preforming this collection by a defined procedure. For example, in any population, database, or collection of objects, a sample may refer to any individual datum, data point, object, or subset of data, data points, and/or objects.

In electrical engineering and related disciplines, sampling relates to collecting a plurality of measurements of an analog signal or some other physical system. This is a conversion of a continuous signal to a discrete signal. Here the $i^{th}$ sample of a variable X is denoted $x^{(i)}$.

In many fields including simulations of physical systems, computing, especially analog computing, the foregoing meanings merge. A hybrid computer can draw samples from an analog computer. The analog computer as a provider of samples is an example of a "sample generator". The analog computer can be configured to provide samples from a statistical distribution. A probability distribution assigns a respective probability of being sampled to each data point in the population.

An analog processor, such as a quantum processor and in particular a quantum processor designed to perform quantum annealing and/or adiabatic quantum computation, may be operated as a sample generator. Here each sample corresponds to a state of the processor and the population corresponds to all possible states of the processor. Using an analog processor as a sample generator may be a preferred mode of operating the processor for certain applications. Operating an analog processor as a sample generator may also enable a broader range of problems to be solved compared to, for example, using an analog processor to find a low energy state, or preferred state, of a Hamiltonian that encodes an optimization problem.

In some examples, a sampling device including a quantum processor, such as shown in FIG. 1, exploits the inherent randomness in a physical system, and the associated act of measurement, as a source of randomness. Such a system provides samples from even highly multi-modal distributions. In some examples, the sampling rate is quicker than possible from a digital computer. In some examples, thermal effects contribute to randomness. In some examples, quantum effects contribute to randomness. In some examples, both quantum effects and thermal effects contribute to randomness.

In ideal non-quantum physical systems, samples can be governed by a statistical distribution such as the Boltzmann distribution where; the probability varies as an inverse exponential of the energy so that high energy states have low probability, and low energy states have high probability. In some examples, a sampling device at high temperature produces random samples. In non-quantum non-ideal physical systems, samples can be governed by a different statistical distribution. This is an example of an available statistical distribution versus a target distribution. Often sampling from a target distribution is desirable but for the intractable nature of the sampling process so an available destitution is used. In some physical systems, these thermal effects compete with quantum effects.

Quantum effects offer a source of randomness. In ideal quantum physical systems, samples can be governed by quantum mechanics. The samples can be affected by the presence of off-diagonal terms in the Hamiltonian and the act of measuring the system. With large off-diagonal terms in the Hamiltonian, a system can, given a short evolution time, be effectively randomized. In examples, a sampling device produces a sample from an available probability distribution that is governed by both thermal effects and quantum effects.

Each configuration in a set of spins has an energy. If the set of spins has local biases on some or all of the spins and is limited to two spin interactions then conventionally the energy is represented as:

$$E(s_1 \ldots s_N) \propto \sum_{i \in V} h_i s_i + \sum_{i,j \in E} J_{i,j} s_i s_j \qquad (10)$$

Here the variables represent spins (that is, $s_i$ in $\{-1, +1\}$) and a set of spins is a configuration. Each configuration has a probability. If the probability is Boltzmann the probability can be expressed as:

$$p(s_1 \ldots s_N) = e^{-E(s_1 \ldots s_N)/k_B T}/Z \qquad (11)$$

Here T is temperature, and $k_B$ is the Boltzmann constant. The Boltzmann constant can be set to one without loss of generality. The denominator, Z, is the partition function and is a normalization factor. It is a sum of the exponent of the negative energy divided by $k_B T$ for all the configurations.

Figure 11:
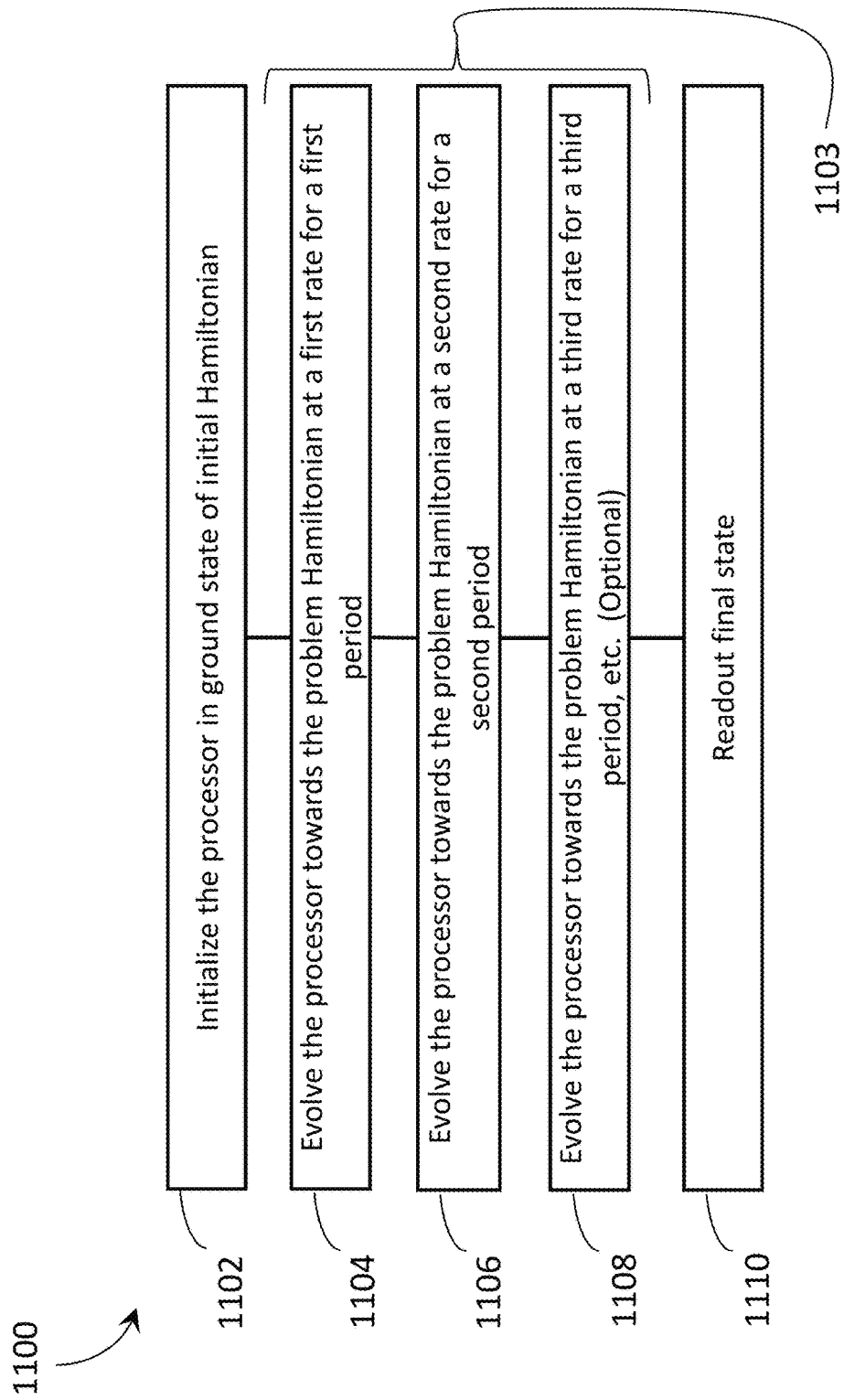
FIG. 11 is a flow diagram showing a method of operating a quantum processor with non-monotonic evolution in accordance with the present systems, devices, articles, and methods.

FIG. 11 is a flow diagram showing a method of operating a quantum processor with non-monotonic evolution for the purposes of drawing samples. The method 1100 describes the acts associated with the evolution described in FIG. 5. Method 1100 could be implemented by a processor following a series of processor readable instructions stored on a non-transitory process-readable media. In some embodiments, method 1100 is performed by a specialized device such as an adiabatic quantum computer or a quantum annealer, or a hybrid computer including a digital computer and an analog computer. Method 1100 will be described in relation to hybrid computer as an example.

At 1102, the hybrid computer initializes a quantum processor in a ground state of an initial Hamiltonian. The initial Hamiltonian may have an accessible ground state. At 1104, the hybrid computer causes the instant Hamiltonian to evolved toward the final Hamiltonian at a first rate for a first time period. That is a first part of the evolution schedule.

The first part of the evolution schedule used by the hybrid computer can vary. In some implementations, the evolution is linear. In some implementations, the evolution is non-linear. In a linear evolution, the rate is constant. In a non-linear evolution the rate varies and an average rate characterizes the rate over the first period. In some implementations, the first part of evolution is monotonic. In some implementations, the first part of evolution is non-monotonic.

At 1106, the hybrid computer causes the instant Hamiltonian to evolve toward the final Hamiltonian at a second rate for a second time period. At 1108, optionally, the hybrid computer caused the instant Hamiltonian to evolve toward the final Hamiltonian at a third rate for a third time period.

Acts 1104, 1106, and optional act 1108 when present, comprise a piecewise evolution, collectively 1103. A hybrid computer can cause a quantum processor to evolve under a piecewise evolution schedule. In some piecewise evolutions the problem Hamiltonian does not change from one part of the evolution to the next.

The relative values of the first rate, the second rate, and the third rate can be varied. A useful set of rates includes having the second rate far exceed the first rate. At the beginning of annealing, thermal transitions between quantum eigenstates are very fast. The quantum processor will be in the equilibrium state. As the annealing proceeds, transitions become slower. Eventually freeze out occurs. In general, different transition channels freeze at different points during the annealing. For example, a channel of transition between two states with large Hamming distance will freeze earlier than transition between two states with a small Hamming distance.

In other words, instead of an evolution characterized by a constant rate of change, for example a linear evolution, there is an evolution that changes very slowly up to some point and then very rapidly after that. The act of following such an evolution increases the Boltzmannliness, degree of fit to the Boltzmann distribution, of the samples from the quantum processor. In implementations where the second rate exceeds the first rate, the first rate should be slow enough so that no transition channel will be frozen and therefore equilibrium distribution is guaranteed. The second rate should be so fast that all transition channels freeze and therefore the thermal distribution will not be affected. For example, the time taken during the second annealing person should be shorter than the inverse of the tunneling rate of the instant Hamiltonian just prior to the second time period. In the limit of infinitely slow sweep at the beginning and infinitely fast sweep in the second part of the annealing, an ideal Boltzmann distribution can be achieved. An example of the second rate is set by the second time period and change in the evolution parameter.

At 1110, the hybrid computer reads out the final state of the quantum processor. The final state of the system may be returned or may be recorded. In some implementations, a series of final states is recorded with the associated set of first periods.

Method 1100 may by summarized as a computational method including initializing of an analog processor to a first initial state and causing the analog processor to evolve from the initial state, under a piecewise evolution schedule, toward a first final state determined by a problem Hamiltonian associated with first computational problem. The method further including reading out the first final state thereby determining a first result of the first computational problem. Method 1100, as summarized, may be implemented by a system from processor readable instructions stored on at least one non-transitory computer- or processor-readable media.

Method 1100 may be used to solve problems other than sampling problems. For example, method 1100 may be used to solve a constraint satisfaction problem. The user of a hybrid computer could define a piecewise annealing schedule that includes two or more parts of the annealing schedule. In some examples, the piecewise annealing schedule includes a plurality of linear annealing schedules. In some examples, the piecewise annealing schedule includes a plurality of both linear annealing schedules and non-linear annealing schedules.

VI) Hybrid Quantum-Thermal Annealer

Figure 12:
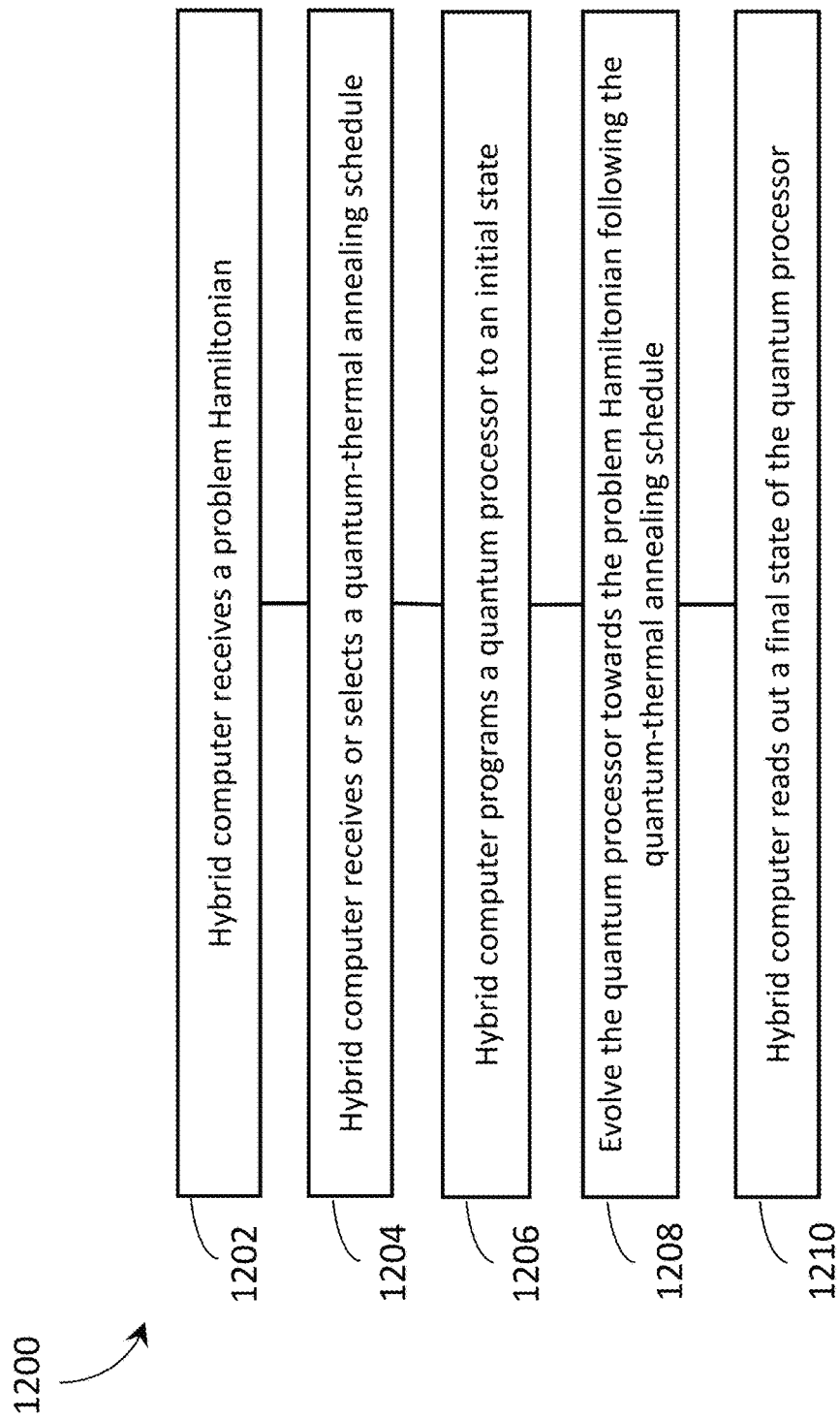
FIG. 12 is a flow diagram showing a method of preforming hybrid quantum-thermal annealing in accordance with the present systems, devices, articles, and methods.

FIG. 12 shows a method 1200 of annealing using both thermal transition and quantum transitions as a tunable source of delocalization. Method 1200 could be implemented by a processor following a series of processor readable instructions stored on a non-transitory processor-readable media. In some implementations, method 1200 is performed by a specialized device such as a hybrid computer including a digital computer and an analog computer operating as a hybrid quantum-thermal solver. Method 1200 will be described in relation to hybrid computer as an example.

At 1202, a hybrid computer receives a problem Hamiltonian, $H_P$. The hybrid computer is tasked find a solution to the problem embodied in the problem Hamiltonian. Examples of a problem include a constraint satisfaction problem, sampling problem, and the like. At 1204, the hybrid receives, or selects, an evolution schedule. This evolution schedule includes a hybrid thermal-quantum evolution schedule component. The hybrid thermal-quantum evolution schedule component includes information prescribing a variation over time of a first balance between thermal energy relative to energy potential of the problem Hamiltonian, and a second balance between quantum fluctuations relative to energy potential of the problem Hamiltonian.

At 1206, the hybrid computer programs the quantum processor to an initial state. In other words, the hybrid computer establishes an evolution Hamiltonian on a quantum processor. An example of a quantum processor is a superconducting quantum processor, such as, shown in FIG. 2. In some implementations, the evolution Hamiltonian includes an initial Hamiltonian, as a principal portion of the evolution Hamiltonian. In some implementations, the evolution Hamiltonian includes a delocalization component. See Equation (3) for an example of a delocalization component. An example of an evolution Hamiltonian is described by Equation (2). It includes a delocalization Hamiltonian and problem Hamiltonian with time varying coefficients. In some implementations, the hybrid computer uses a programming subsystem to establish an evolution Hamiltonian on a quantum processor.

At 1208, the hybrid computer causes the quantum processor to be evolved towards a final state associated with the problem Hamiltonian in accordance with the hybrid thermal-quantum evolution schedule. In some implementations, an evolution subsystem is used to implement the hybrid thermal-quantum evolution schedule. For example, hybrid computer gradually removes the delocalization terms in the evolution Hamiltonian.

At 1210, the hybrid computer measures the state of the quantum processor. In some implementations, this may involve reading out the state of all or a portion of the qubits in the hardware graph or working graph by, for example, a readout subsystem. In some examples, the readout subsystem uses one or more DC-SQUIDs to measure the persistent current state of each qubit. Further descriptions of systems, devices, methods, and articles for qubit readout are described in U.S. Pat. Nos. 7,639,035; 8,169,231; and 8,854,074.

Returning to the annealing schedule recited in act 1208. The method 1200 includes a hybrid quantum-thermal annealing schedule. The device implementing the schedule would be a specialized computer, a hybrid quantum-thermal solver that could find solution to problems by applying a mix of the following: quantum annealing and thermal annealing. The hybrid thermal-quantum evolution schedule component includes information prescribing a variation over time of a first balance between thermal energy relative to energy potential of the problem Hamiltonian, and a second balance between quantum fluctuations relative to energy potential of the problem Hamiltonian.

In some implementations, an evolution subsystem is used to gradually remove the quantum fluctuations from the system of qubits. For example, the hybrid computer raises the height of barriers between the potential wells in the energy landscape of the qubits. The raising of barriers suppresses quantum tunneling as a source of delocalization. For superconducting flux qubits, the hybrid computer raises the height of barriers between the potential wells in the energy profiles of the qubits by increasing the persistent current in the superconducting flux qubits. In some implementations gradually remove the quantum fluctuations from the system of qubits includes increasing a measure of the magnitude of the problem Hamiltonian relative to an aggregated measure of tunneling rates for the plurality of qubits. An example of an aggregated measure is a mean. An example of a measure of the magnitude of the problem Hamiltonian is the mean heights of the barriers.

In some implementations, an evolution subsystem is used to gradually remove the thermal energy from the system. For example, the hybrid computer raises the height of barriers between the potential wells in the energy landscape of the qubits. The raising of barriers to, and above, the thermal energy levels of the system suppresses thermal excitation a source of delocalization. That is, rescaling the potential parts of Hamiltonian raises the barriers to changing state. And raising the barriers without changing the temperature is an equivalent process to thermal annealing where temperature is lowered relative to barriers. For example, for a superconducting flux qubits, the hybrid computer raises the height of barriers between the potential wells by adjusting the flux threading a compound Josephson junction included in a superconducting flux qubit.

In thermal annealing, the delocalization action can be introduced by tuning the temperature according to a determined annealing schedule. The schedule can include moving from a higher temperature to a lower temperature. It can also include a previous increase to the higher temperature. That is, the schedule can include a progression from relatively cool to relatively warmer to relatively cold. For example, a heater, such as an on-chip resistor, can be operated to selectively warm a quantum processor. A refrigerator, such as an Oxford Triton 400 dilution refrigerator with 400 μW cooling power at 100 mK, may be operated to selectively cool the quantum processor. To cool a quantum processor from 50 mK to 25 mK, may take between about 100 μs to 1 ms.

In thermal annealing, the dislocation action can be introduced by changing the barrier heights in the problem Hamiltonian. This changes the effective temperature of the system. One changes the effective temperature by changing the height of the barriers in the well.

As the hybrid computer causes the quantum processor to be annealed towards the final state, the influence of the delocalization Hamiltonian declines relative to the influence of the problem Hamiltonian. In some implementations, a plurality of local bias value and coupling values defining the problem Hamiltonian are slowly applied to the quantum processor. In some implementations, the plurality of local bias values and coupling values are present and the magnitudes of the delocalization terms, relative to the plurality of local bias value and coupling values, are decreased.

That is, the thermal cooling can be combined with the quantum annealing. In some examples, a quantum processor may be designed to perform hybrid quantum thermal annealing. In this process, an evolution Hamiltonian is proportional to the sum of a first term proportional to the problem Hamiltonian and a second term proportional to the quantum delocalization Hamiltonian and a third term proportional to a thermal delocalization Hamiltonian. An evolution Hamiltonian may be represented by:

$$H_E \propto A(t)H_D + B(t)H_P + C(t)K \qquad (12)$$

where $H_E$ is the evolution or instantaneous Hamiltonian, $H_P(t)$ is the problem Hamiltonian, $H_D$ is the quantum delocalization Hamiltonian, K is the thermal delocalization Hamiltonian, and A, B, and C are examples of evolution coefficients which controls the rate of evolution. The combined term C(t)K quenches thermal energy from the system. Examples of the thermal delocalization Hamiltonian include Hamiltonians with one and two qubit terms. The thermal delocalization Hamiltonian may have diagonal and off-diagonal terms.

In thermal annealing, the value of the evolution coefficients can vary over time. The coefficient for the problem Hamiltonian does at some point during the evolution, move from a first relative value above the value of the coefficient for the quantum delocalization Hamiltonian to a second relative value below the value of the coefficient for the quantum delocalization Hamiltonian. The coefficient for the quantum delocalization Hamiltonian does have an end value at or near zero. The coefficient for the delocalization Hamiltonian can vary from a value at or near zero to some appreciable value and back to zero. The coefficient for the problem Hamiltonian does, at some point during the evolution, move from a third relative value above the value of the coefficient for the thermal delocalization Hamiltonian to a fourth relative value below the value of the coefficient for the thermal delocalization Hamiltonian.

Figure 13:
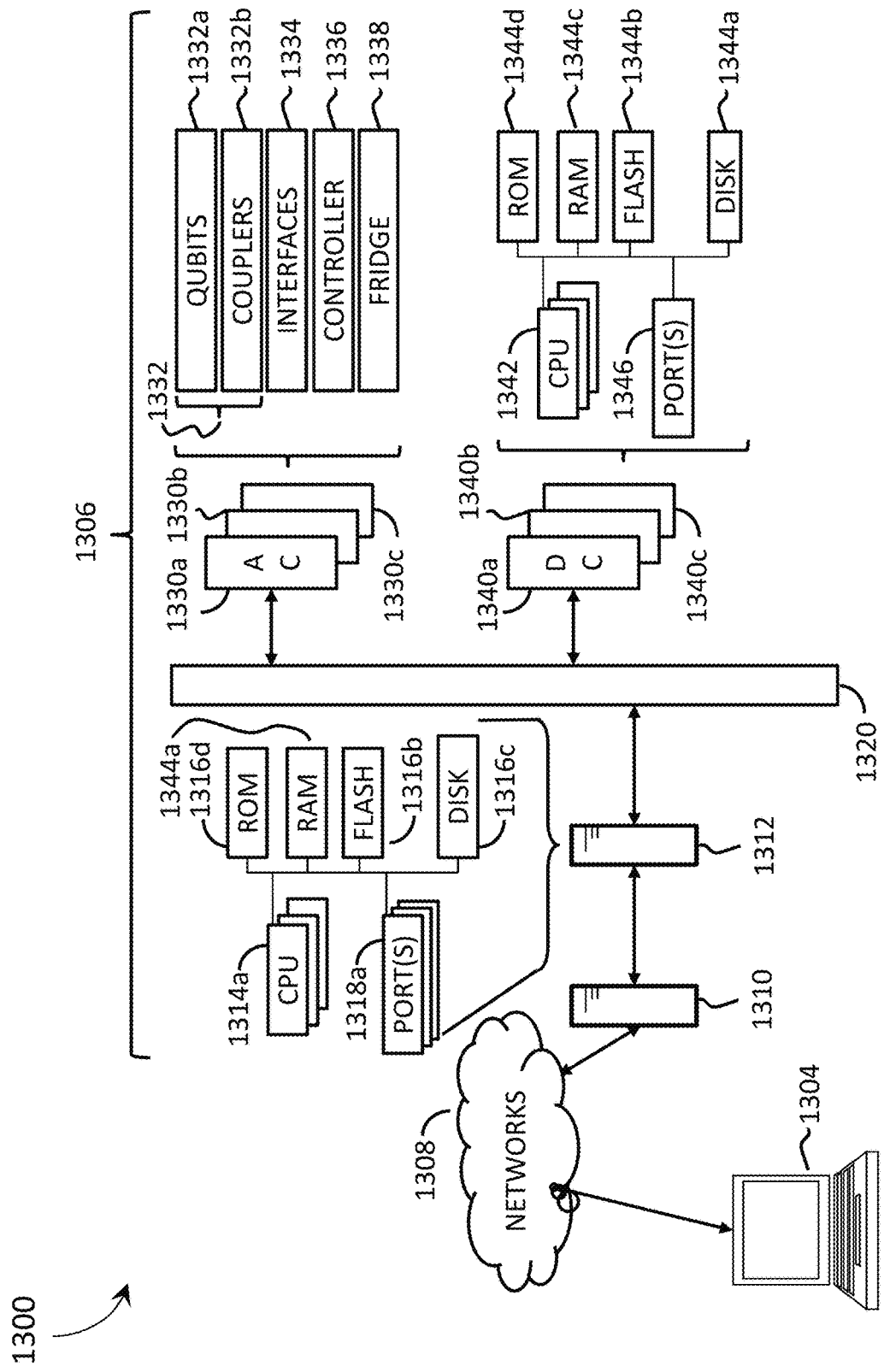
FIG. 13 is a schematic diagram of an environment in which users may access at least one analog computer via one or more networks, in accordance with the presently described systems, devices, articles, and methods, illustrating various hardware structures and interconnections therebetween.

FIG. 13 shows an exemplary networked environment 1300 in which a plurality of end users 1302 (one shown) operate end user processor-based devices 1304 (one shown) to access a computational system 1306 via one or more communications channels such as networks 1308, according to the presently described systems, devices, articles and methods.

The end user processor-based devices 1304 may take any of a variety of forms, for example including desktop computers or workstations, laptop computers, tablet computers, netbook computers, and/or smartphones.

The computational system 1306 may include a front-end processor-based device, for example, a server computer system such as a Web server computer system 1310 which includes one or more processors (not shown), non-transitory processor-readable media (not shown) and which executes processor-executable server instructions or software. The front-end server or Web server computer system 1310 handles communication with the outside world. For example, the Web server computer system 1310 provides an interface (server application programming interface or SAPI) for the submission by the end user processor-based devices 1304 of problems to be solved. Also for example, the Web server computer system 1310 provides results of problem solving to the end user processor-based devices 1304. The Web server computer system 1310 may provide a user friendly user interface, for example a Web-based user interface. The Web server computer system 1310 may, for example, handle users' accounts, including authentication and/or authorization to access various resources. The Web server computer system 1310 may also implement a firewall between the remainder of the computational system 1306 and the outside world (e.g., end user processor-based devices 1304).

The SAPI accepts a broader range of problems including, sampling problems, pseudo-Boolean optimization problems, and constraint satisfaction problems. End users may, for example, indicate whether the solving should identify minima or should sample with Boltzmann probability. The SAPI also supports unconstrained QUBOs of arbitrary connectivity. That is accepts a logical graph with different connectivities than a working graph. The SAPI also accepts graphical models, for instance factor-graph description of undirected graphical models defined over binary-valued variables. The SAPI may allow for a description of factors specified with the scope of the factor and an extensional list of factor values. Support is preferably provided for factors mapping inputs to floating point values and to Boolean values for constraint satisfaction problems (CSP). The SAPI also accepts quadratic assignment problems (QAPs) since many practical problems involve assignment constraints. The SAPI may accept satisfiability problems (SAT), for instance: k-SAT, a CSP version; or max (weighted) SAT, the optimization version. Standard DIMACS formats exist for both types of problems.

The computational system 1306 may include job manager hardware 1312 which manages jobs (i.e., submitted problems and results of problem solving). The job manager hardware 1312 may be implemented as a standalone computing system, which may include one or more processors 1314, processor-readable non-transitory storage media 1316a-1316d (four shown, collectively 1316) and communications ports 1318a (three shown, collectively 118). The processor(s) 1314 may take a variety of forms, for example one or more microprocessors, each having one or more cores or CPUs, registers, etc. The job manager hardware 1312 may include volatile media or memory, for example static random access memory (SRAM) or dynamic random access memory (DRAM) 1316a. The job manager hardware 1312 may include non-volatile media or memory, for example read only memory (ROM) 1316d, flash memory 1316b, or disk based memory such as magnetic hard disks, optical disks 1316c, magnetic cassettes, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-line Memory Modules. The processor-readable non-transitory storage media 1316 store(s) at least one set of processor-executable instructions and/or data to manage problem solving jobs, which when executed by the job manager hardware 1312 implements a job manager.

The computational system 1306 may include resource manager hardware 1320 which manages hardware resources (e.g., processors) for use in solving problems via a plurality of solvers. The resource manager hardware 1320 may be implemented as a standalone computing system, which may include one or more processors, each having one or more cores, processor-readable non-transitory storage media and one or more communications ports 126. The processor(s) may take a variety of forms, for example one or more microprocessors, each having one or more cores or CPUs, registers, etc. The resource manager hardware may include non-volatile media or memory, for example read only memory (ROM), flash memory, or disk based memory such as magnetic hard disks, optical disks, etc. The resource manager hardware 1320 may include volatile media or memory, for example static random access memory (SRAM) or dynamic random access memory (DRAM). The processor-readable non-transitory storage media store(s) at least one of set pf processor-executable instructions and/or data which when executed by the resource manager hardware 1320 implements a resource manager to manage hardware resources, for example the various non-quantum processor systems and/or quantum processor systems set out immediately below. The resource manager may, for instance, manage an allocation of processor resources (e.g., quantum processor(s)) to solve a submitted problem via one or more solvers.

As noted above, the computational system 1306 may further include a plurality of solver processor systems which execute solver instructions or software to implement a plurality of solvers to solve appropriate types of problems (e.g., QUBO matrix, satisfiability (SAT) problem, a graphical model (GM) or a quantum assignment problem (QAP)).

The solver processor systems may, for example, include one or more analog computers 1330a-1330c (three illustrated, collectively 1330, only one shown in detail). Analog computers 1330 may take a variety of forms. Typically, analog computers 1330 will include one or more quantum processors 1332 comprised of a plurality of qubits 1332a and couplers 1332b (e.g., tunable ZZ-couplers) which are controllable to set a coupling strength between respective pairs of qubits 1332a to provide pair-wise coupling between qubits. The quantum processor systems 130 may be implemented to physically realize quantum annealing (QA) and/or adiabatic quantum computing (AQC) by initializing the system in an initial state preferred by an initial Hamiltonian and evolving the system to a final state preferred by a problem Hamiltonian.

The analog computers 1330 typically include a plurality of interfaces 1334 operable to set or establish conditions or parameters of the qubits 1332a and couplers 1332b, and to read out the states of the qubits 1332a, from time-to-time. The interfaces 1334 may include a local bias interface to provide controllable local biases to the qubits 1332a (e.g., tunable Z-bias). The interfaces 1334 may each be realized by a respective inductive coupling structure, as part of a programming subsystem and/or an evolution subsystem. Interfaces for reading out states may, for instance take the form of DC-SQUID magnetometers. Such a programming subsystem and/or evolution subsystem may be separate from analog computers 1330, or it may be included locally (i.e., on-chip with quantum processor 1332) as described in, for example, U.S. Pat. Nos. 7,876,248 and 8,035,540.

The analog computers 1330 typically each include a controller 1336, for instance a digital computer system, which is operated to configure the quantum processor 1332. The quantum processors systems 130 typically each include a refrigeration system 1338, operable to reduce a temperature of the quantum processor 1332 to a point at or below which various elements of the quantum processor 1332 (e.g., qubits 1332a, couplers 1332b) superconduct. Superconducting quantum computers normally are operated at millikelvin temperatures and often are operated in a dilution refrigerator. Examples of dilution refrigerators include the Oxford Instruments Triton 400 (Oxford Instruments plc, Tubney Woods, Abingdon, Oxfordshire, UK) and BlueFors LD 400 (Blue-Fors Cryogenics Oy Ltd, Arinatie 10, Helsinki, Finland). All or part of the components of quantum processor may be housed in a dilution refrigerator. The analog computer 1330 may include a heater thermally coupled to the quantum processor 1332.

In the operation of an analog computers 1330, interfaces 1334 may each be used to couple a flux signal into a respective compound Josephson junction of qubits 1332a, thereby realizing the tunneling terms (also called $\Delta_i$ terms) in the system Hamiltonian. This coupling provides the off-diagonal terms ($\sigma^x$ terms) of the Hamiltonian and these flux signals are examples of "dislocation signals." Other ones of the interfaces 1334 may each be used to couple a flux signal into a respective qubit loop of qubits 1332a, thereby realizing the local bias terms (also called $h_i$ terms) in the system Hamiltonian. This coupling provides the diagonal terms ($\sigma^z$ terms). Furthermore, one or more interfaces 1334 may be used to couple a flux signal into couplers 1332b, thereby realizing the $J_{i,j}$ term(s) in the system Hamiltonian. This coupling provides the diagonal terms ($\sigma^z_i \sigma^z_j$ terms). Thus, throughout this specification and the appended claims, the terms "problem formulation" and "configuration of a number of programmable parameters" are used to refer to, for example, a specific assignment of $h_i$ and $J_{i,j}$ terms in the system Hamiltonian of a superconducting quantum processor via, for example, interfaces 1334.

The solver processor systems may, include one or more analog computers 1330. Each analog computer 1330 may implement a different form of annealing and/or different hybridization of quantum annealing and thermal annealing. See FIG. 12 for an example of hybrid quantum thermal annealing. The resource manager hardware 1320 may direct problems to different solvers and/or the same problem to two or more solvers. For example, the resource manager hardware 1320 may direct a first instance of a first problem to analog computer 1330a implementing thermal annealing. The resource manager hardware 1320 may direct a second instance of the first problem to analog computer 1330b implementing quantum annealing. The resource manager hardware 1320 may direct a second instance of the first problem to analog computer 1330b implementing a hybrid of quantum annealing and thermal annealing.

The solver processor systems may, for example, include one or more non-quantum processor systems. Non-quantum processor systems may take a variety of forms, at least some of which are discussed immediately below.

For example, the non-quantum processor systems may include one or more microprocessor based systems 1340a-1340c (three illustrated, collectively 1340, only one shown in detail). Typically, microprocessor based systems 1340 will each include one or more microprocessors 1342 (three shown, only one called out), processor-readable non-transitory storage media 1344a-1344d (four shown, collectively 1344) and one or more communications ports 1346. The processor(s) 1342 may take a variety of forms, for example one or more microprocessors, each having one or more cores or CPUs with associated registers, arithmetic logic units, etc. The microprocessor based systems 1340 may include non-volatile media or memory, for example read only memory (ROM) 1344d, flash memory 1344b, or disk based memory such as magnetic hard disks 1344c, optical disks, etc. The microprocessor based systems 140 may include volatile media or memory, for example static random access memory (SRAM) or dynamic random access memory (DRAM) 1344a. The processor-readable non-transitory storage media 1344 store(s) at least one of a set of processor-executable instructions and/or data which when executed by the microprocessor based systems 1342 implements a microprocessor based solver to solve a submitted problem.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. To the extent that they are not inconsistent with the specific teachings and definitions herein, all of the US patents, US patent application publications, US patent applications, referred to in this specification and/or listed in the Application Data Sheet, including U.S. provisional patent application Ser. No. 62/013,393, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for use in quantum processing, comprising:
at least one non-transitory processor-readable medium that stores at least one of processor executable instructions or data; and
at least one processor communicatively coupled to the least one non-transitory processor-readable medium, and which, in response to execution of the at least one of processor executable instructions or data:
for a first computational problem, during a first iteration of a plurality of iterations:
receives a problem Hamiltonian for the first computational problem;
receives an initial solution to the first computational problem;
receives an evolution schedule;
initializes an analog processor to a first final state based on the initial solution, the analog processor comprising:
a plurality of quantum devices;
a plurality of local bias devices to provide controllable local biases to the plurality of quantum devices; and
a plurality of couplers to provide controllable communicative coupling between respective pairs of quantum devices in the plurality of quantum devices;
causes the analog processor to evolve backwards within the evolution schedule from the initial solution towards a state preferred by an initial Hamiltonian reaching a first turning point;
causes the analog processor to evolve forwards within the evolution schedule from the first turning point towards a second final state preferred by the problem Hamiltonian; and reads out the second final state thereby determining a second result of the first computational problem.

2. The system of claim 1 wherein, in response to execution of the at least one of processor executable instructions or data, the at least one processor:
for the first computational problem, during a second iteration of the plurality of iterations, the second iteration different from the first iteration:
re-initializes an analog processor to the first final state based on the initial solution;
causes the analog processor to re-evolve backwards within the evolution schedule from the initial solution towards a state preferred by an initial Hamiltonian reaching a second turning point;
causes the analog processor to re-evolve forwards within the evolution schedule from the second turning point towards a third final state preferred by the problem Hamiltonian; and
reads out the third final state thereby determining a third result of the first computational problem.

3. The system of claim 2 wherein, in response to execution of the at least one of processor executable instructions or data, the at least one processor:
records the second result and a value correlated with the first turning point; and
records the third result and a value correlated with the second turning point.

4. The system of claim 2 wherein, in response to execution of the at least one of processor executable instructions or data, the at least one processor:
returns the second result and a value correlated with the first turning point; and
returns the third result and a value correlated with the second turning point.

5. A computational method, comprising:
receiving a problem Hamiltonian for a first computational problem;
receiving an initial solution to the first computational problem;
receiving an evolution schedule;
for a first computational problem, during a first iteration of a plurality of iterations:
initializing an analog processor to a first final state based on the initial solution, wherein the analog processor comprises:
a plurality of quantum devices;
a plurality of local bias devices to provide controllable local biases to the plurality of quantum devices; and
a plurality of couplers to provide controllable communicative coupling between respective pairs of quantum devices in the plurality of quantum devices;
causing the analog processor to evolve backwards within the evolution schedule from the initial solution towards a state preferred by an initial Hamiltonian;
causing the analog processor to evolve forwards within the evolution schedule from a first turning point towards a second final state preferred by the problem Hamiltonian; and
reading out the second final state of the quantum devices to determine a second result of the first computational problem.

6. The method of claim 5, further comprising
for the first computational problem, during a second iteration of the plurality of iterations, the second iteration different from the first iteration:
re-initializing an analog processor to the first final state based on the initial solution;
causing the analog processor to re-evolve backwards within the evolution schedule from the initial solution towards a state preferred by an initial Hamiltonian;
causing the analog processor to re-evolve forwards within the evolution schedule from a second turning point towards a third final state preferred by the problem Hamiltonian; and
reading out the third final state to determine a third result of the first computational problem.

7. The method of claim 6, further comprising:
recording the second result and a value correlated with the first turning point; and
recording the third result and a value correlated with the second turning point.

8. The method of claim 6, further comprising:
returning the second result and a value correlated with the first turning point; and
returning the third result and a value correlated with the second turning point.

* * * * *